United States Patent
Lim et al.

(10) Patent No.: US 9,282,521 B2
(45) Date of Patent: Mar. 8, 2016

(54) METHOD AND DEVICE FOR CONTROLLING UPLINK TRANSMIT POWER IN WIRELESS ACCESS SYSTEM

(71) Applicant: LG ELECTRONICS INC., Seoul (KR)

(72) Inventors: Suhwan Lim, Anyang-si (KR); Sangwook Lee, Anyang-si (KR); Manyoung Jung, Anyang-si (KR); Yoonoh Yang, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/385,518

(22) PCT Filed: Mar. 22, 2013

(86) PCT No.: PCT/KR2013/002399
§ 371 (c)(1),
(2) Date: Sep. 16, 2014

(87) PCT Pub. No.: WO2013/141647
PCT Pub. Date: Sep. 26, 2013

(65) Prior Publication Data
US 2015/0031410 A1    Jan. 29, 2015

Related U.S. Application Data

(60) Provisional application No. 61/613,991, filed on Mar. 22, 2012.

(51) Int. Cl.
| | | |
|---|---|---|
| H04W 52/00 | (2009.01) | |
| H04W 52/14 | (2009.01) | |
| H04W 52/24 | (2009.01) | |
| H04W 52/36 | (2009.01) | |
| H04W 52/34 | (2009.01) | |

(52) U.S. Cl.
CPC .......... *H04W 52/146* (2013.01); *H04W 52/244* (2013.01); *H04W 52/367* (2013.01); *H04W 52/34* (2013.01)

(58) Field of Classification Search
CPC ............................ H04W 52/146; H04W 52/34
USPC .......... 455/522, 69, 67.11, 127.1, 126, 452.2, 455/434, 515
See application file for complete search history.

(56) References Cited

U.S. PATENT DOCUMENTS

| 2010/0238863 A1 | 9/2010 | Guo et al. |
| 2011/0243087 A1 | 10/2011 | Ahn et al. |

(Continued)

FOREIGN PATENT DOCUMENTS

| KR | 10-2010-0106246 A | 10/2010 |
| KR | 10-2011-0097900 A | 8/2011 |
| WO | WO 2010/065759 A2 | 6/2010 |

*Primary Examiner* — John J Lee
(74) *Attorney, Agent, or Firm* — Birch, Stewart, Kolasch & Birch, LLP

(57) ABSTRACT

The present invention discloses a method and device for controlling uplink transmit power of a terminal in a wireless access system that supports carrier aggregation/multiple cells. In particular, the method may include receiving a first TA value and a second TA value for a first timing advance group (TAG) including one or more component carriers and a second TAG including one or more component carriers, adjusting uplink transmission timing of the first TAG and the second TAG by using the first TA value and the second TA value, resetting a transient period between a first group of component carriers and a second group of component carriers exceeds a power control requirement, and controlling uplink transmit power according to the reset transient period.

14 Claims, 25 Drawing Sheets

(56) References Cited

U.S. PATENT DOCUMENTS

| | | | |
|---|---|---|---|
| 2012/0178494 A1* | 7/2012 | Haim et al. | 455/522 |
| 2013/0058315 A1* | 3/2013 | Feuersanger et al. | 370/336 |
| 2013/0176953 A1* | 7/2013 | Stern-Berkowitz et al. | 370/329 |
| 2014/0023030 A1* | 1/2014 | Jeong et al. | 370/329 |

* cited by examiner

FIG. 6
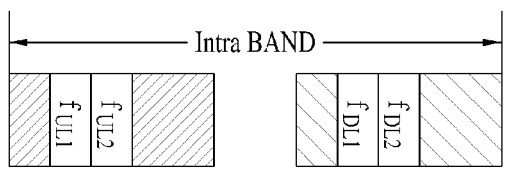
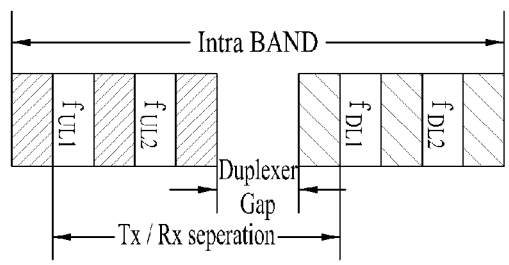
(a) Intra-band contiguous CA  (b) Intra-band non-contiguous CA FIG. 7
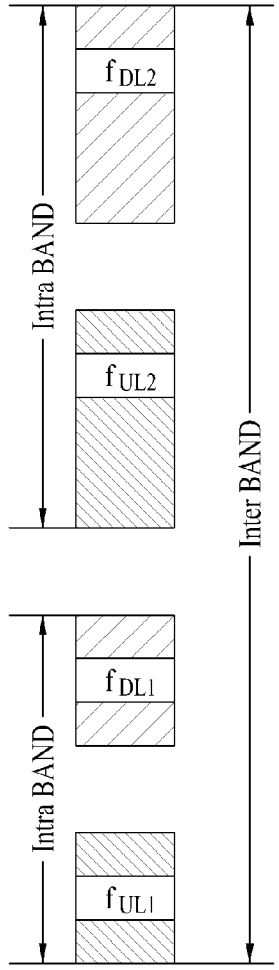
(a) Combined of Low-band and high-band for inter-band CA
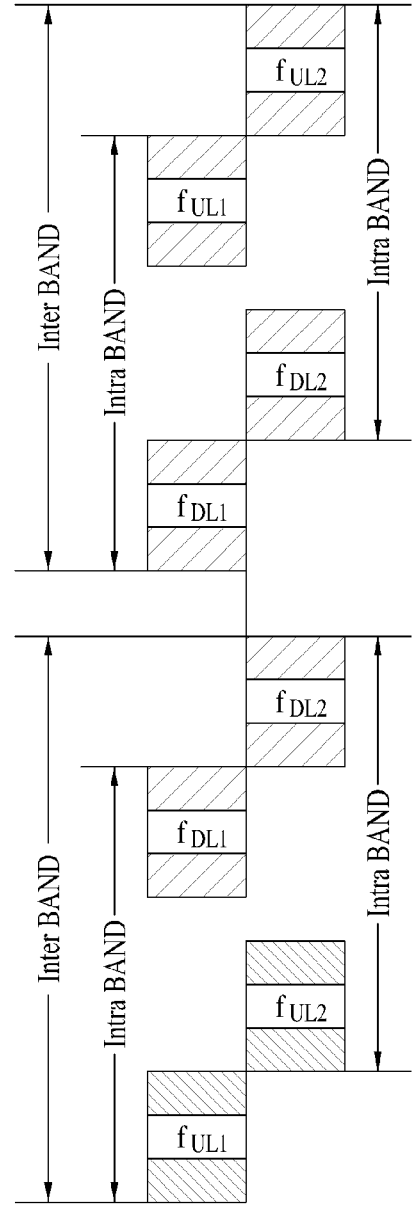
(b) Combined of similar frequency band for inter-band CA

* Transient period is only specified in the case of frequency hopping or a power change between SRS symbols FIG. 22
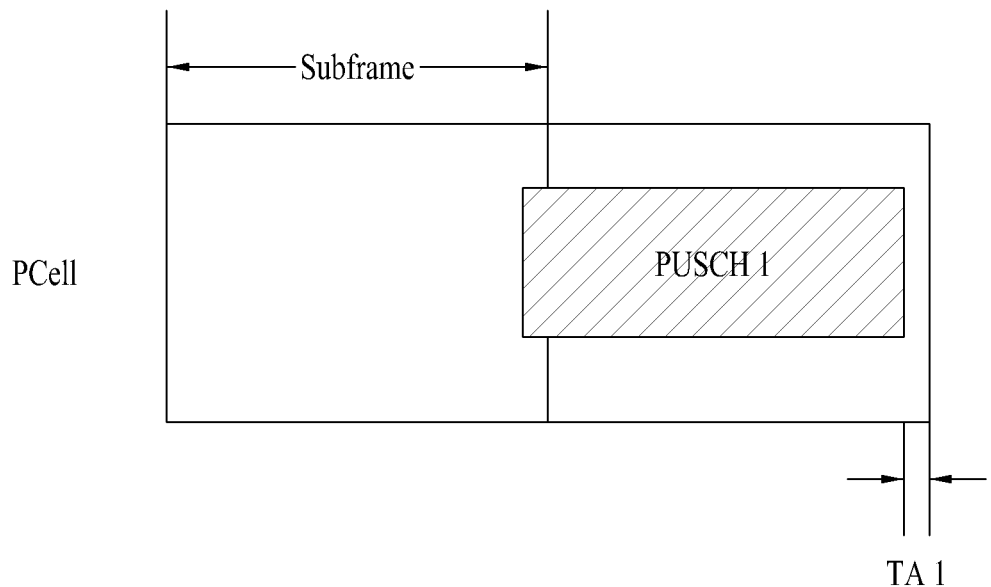
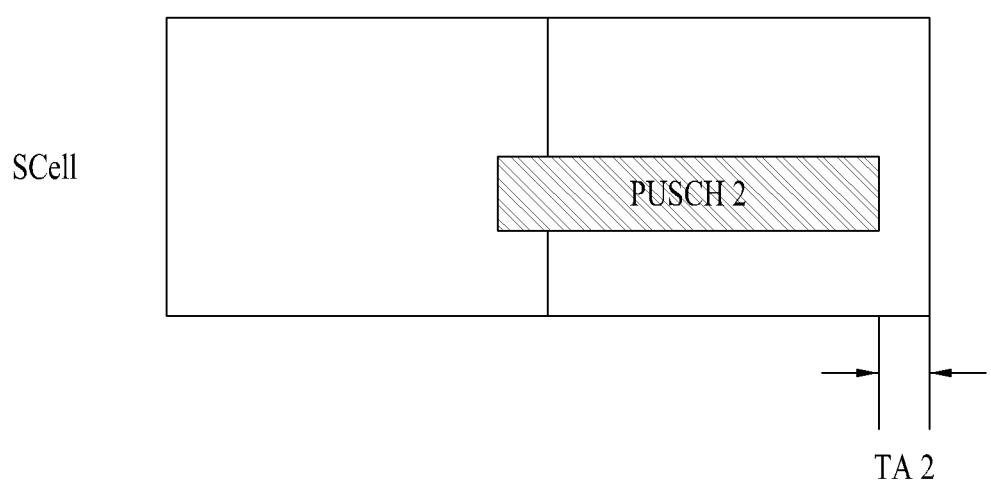

METHOD AND DEVICE FOR CONTROLLING UPLINK TRANSMIT POWER IN WIRELESS ACCESS SYSTEM

CROSS REFERENCE TO RELATED APPLICATIONS

This application is the National Phase of PCT International Application No. PCT/KR2013/002399, filed on Mar. 22, 2013, which claims priority under 35 U.S.C. 119(e) to U.S. Provisional Application No. 61/613,991, filed on Mar. 22, 2012, all of which are hereby expressly incorporated by reference into the present application.

TECHNICAL FIELD

The present invention relates to a wireless access system, more particularly, to a method of controlling uplink transmit power of a user equipment in a wireless access system supporting carrier aggregation/multiple cells and an apparatus therefor.

BACKGROUND ART

One of most important things of a next generation wireless access system is to satisfy data transfer rate demand. To this end, ongoing effort to develop various technologies including MIMO (multiple input multiple output), CoMP (cooperative multiple point transmission), a relay and the like is in progress.

In a wireless access system according to a related art, even if an uplink (UL) and a downlink (DL) are set to differ from each other in bandwidth, a single carrier is mainly taken into consideration. For instance, a wireless communication system having UL and DL carriers, each of which number is 1, and UL and DL bandwidths generally symmetric to each other is provided based on a single carrier.

Yet, considering the situation that frequency resources are saturated, as a method of securing broadband bandwidths to meet the higher data transmission rate requirements, CA (carrier aggregation/multiple cells) is introduced in a manner of designing each of scattered bandwidths to operate an independent system and aggregating a plurality of bands into a single system.

In this case, a carrier of an independently operable bandwidth unit is called a component carrier (hereinafter abbreviated CC). In order to support an increasing transmission size, 3GPP LTE-A or 802.16m keeps extending its bandwidth up to 20 MHz or higher. In this case, at least one or more component carriers are aggregated to support the broadband. For instance, if a single component carrier supports a bandwidth of 5 MHz, 10 MHz or 20 MHz, a system bandwidth is supported up to maximum 100 MHz by aggregating maximum 5 component carriers together.

DISCLOSURE OF THE INVENTION

Technical Tasks

According to a conventional communication system, in case that a user equipment aggregates a plurality of component carriers, TA (timing advance) is identically applied to a plurality of the component carriers.

Yet, when component carriers belonging to bands different from each other are aggregated together or component carriers considerably apart from each other on frequency are aggregated together, if an identical TA value is applied to a plurality of the component carriers, since it may considerably affect synchronization of an uplink signal, it is necessary to apply a TA value (multiple TAs) different from each other to each of a plurality of the component carriers.

An object of the present invention is to provide a method and apparatus for controlling uplink transmit power of a user equipment in a transient period in a wireless access system, preferably, in a wireless access system supporting carrier aggregation in case of applying multiple TA.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of controlling uplink transmit power of a user equipment in a wireless access system supporting carrier aggregation includes the steps of receiving a first TA value and a second TA value for a first TAG (timing advance group) including one or more component carriers and a second TAG including one or more component carriers, respectively, adjusting uplink transmission timing of the first TAG and uplink transmission timing of the second TAG using the first TA value and the second TA value, if maximum transmit power of the user equipment exceeds a power control requirement in a region in which subframes different from each other are overlapped except a transient period of a first component carrier group and a second component carrier group, reconfiguring the transient period and controlling the uplink transmit power according to the reconfigured transient period.

To further achieve these and other advantages and in accordance with the purpose of the present invention, according to a different embodiment, a user equipment controlling uplink transmit power in a wireless access system supporting carrier aggregation includes an RF (radio frequency) unit configured to transceive a radio signal and a processor, the processor configured to receive a first TA value and a second TA value for a first TAG (timing advance group) including one or more component carriers and a second TAG including one or more component carriers, respectively, the processor configured to adjust uplink transmission timing of the first TAG and uplink transmission timing of the second TAG using the first TA value and the second TA value, the processor, if maximum transmit power of the user equipment exceeds a power control requirement in a region in which subframes different from each other are overlapped except a transient period of a first component carrier group and a second component carrier group, configured to reconfigure the transient period, the processor configured to control the uplink transmit power according to the reconfigured transient period.

Preferably, the transient period can be reconfigured by a greater value among a difference between the first TA value and the second TA value and the transient period to include the overlapped region.

Preferably, one of a transient period of the first TAG and a transient period of the second TAG can be reconfigured only by the greater value among the difference between the first TA value and the second TA value and the transient period.

Preferably, if the first TAG includes a primary component carrier, a transient period of the second TAG can be reconfigured only by the greater value among the difference between the first TA value and the second TA value and the transient period.

Preferably, if the first TAG includes a primary component carrier, a transient period of the second TAG can be reconfigured to be matched with a transient period of the first TAG to preferentially protect the primary component carrier, data transmitted from the overlapped region of the second TAG is punctured and the punctured data can be transmitted in a manner of being rate-matched in a region except the overlapped region of a subframe including the overlapped region of the second TAG.

Preferably, a transient period of a TAG including an uplink channel of low priority among the first TAG and the second TAG can be reconfigured to be matched with a transient period of a TAG including an uplink channel of high priority in consideration of priority of the uplink channel transmitted from the overlapped region. Data of the TAG of low priority transmitted from the overlapped region is punctured and the punctured data can be transmitted in a manner of being rate matched in a region except the overlapped region of a subframe including the overlapped region of the TAG of low priority.

Preferably, the priority of the uplink channel can be determined as PUCCH (physical uplink control channel), PUSCH (physical uplink shared channel) or PRACH (physical random access channel), and SRS (sounding reference signal) in descending order.

Advantageous Effects

According to embodiment of the present invention, in case of applying multiple TA in a wireless access system, preferably, in a wireless access system supporting carrier aggregation, it is able to smoothly control uplink transmit power of a user equipment in a transient period in a manner of redefining the transient period.

According to embodiment of the present invention, in case of applying multiple TA in a wireless access system, preferably, in a wireless access system supporting carrier aggregation, it is able to smoothly control uplink transmit power of a user equipment in a transient period in a manner of defining priority between uplink channels in the transient period.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 6 and 7 are diagrams for a position relation of a frequency band according to a type of carrier aggregation;

FIG. 22 is a diagram for an example of applying multiple TA according to each component carrier;

BEST MODE

Mode for Invention

Figure 1:
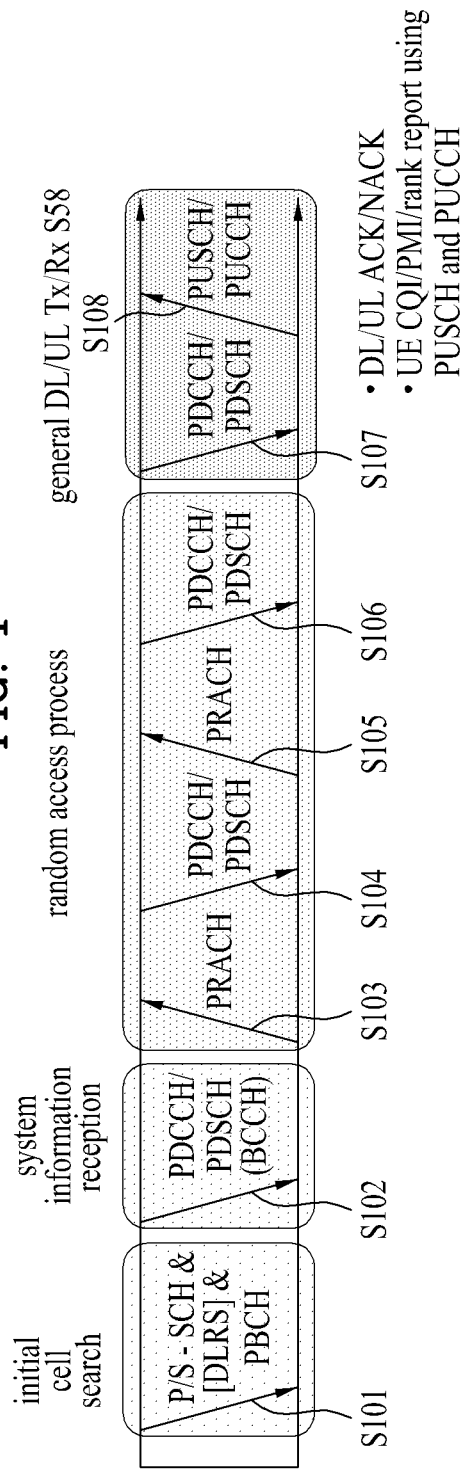
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

3GPP LTE/LTE-A CA System to which the Present Invention is Applicable

FIG. 1 is a diagram for explaining physical channels used for 3GPP system and a signal transmission using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a specific sequence as a preamble via a physical random access channel (PRACH) [S103] and may be then able to receive a response message via PDCCH and a corresponding PDSCH in response to the random access [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
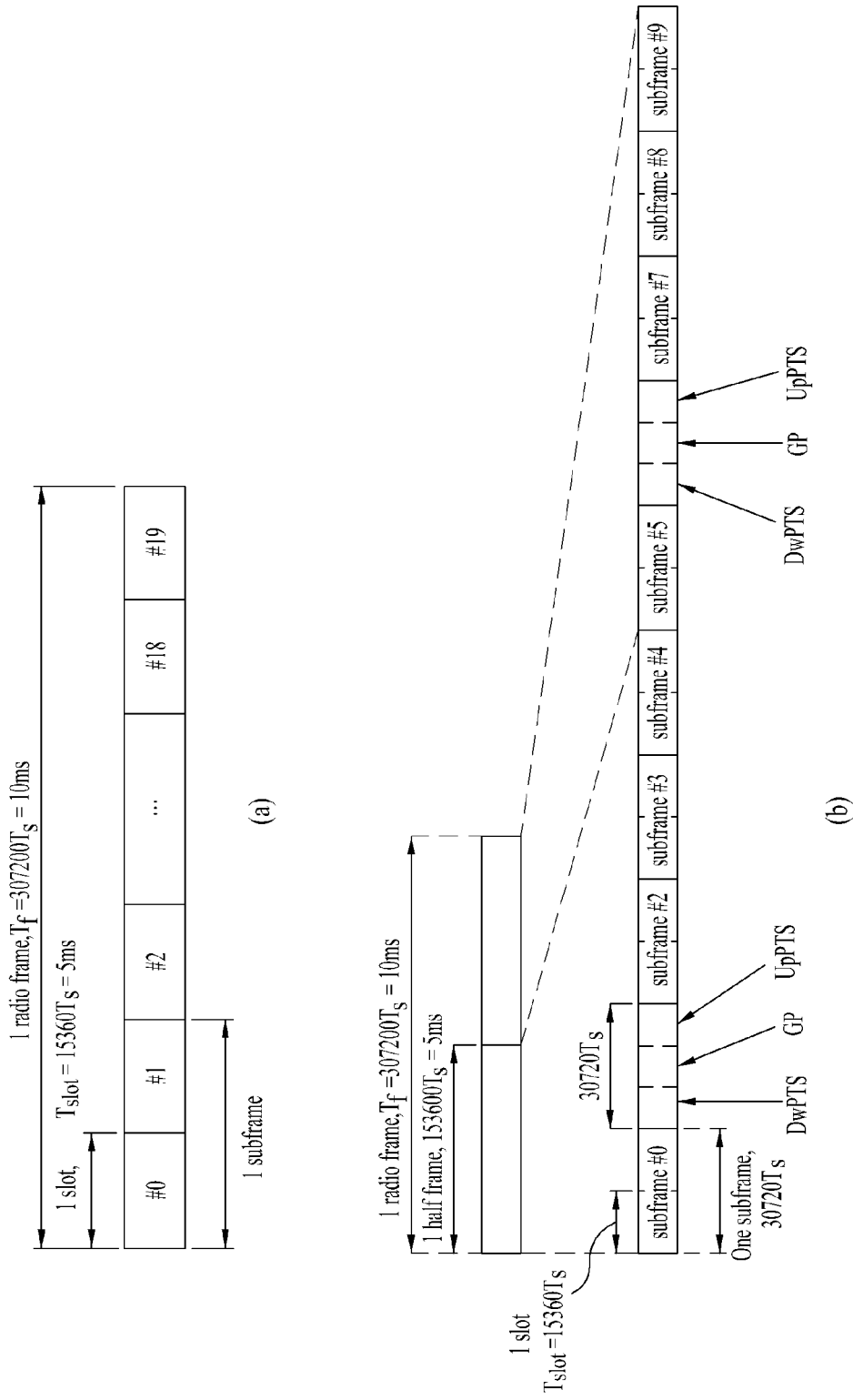
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment. The UpPTS is used for channel estimation in a base station and matching a uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
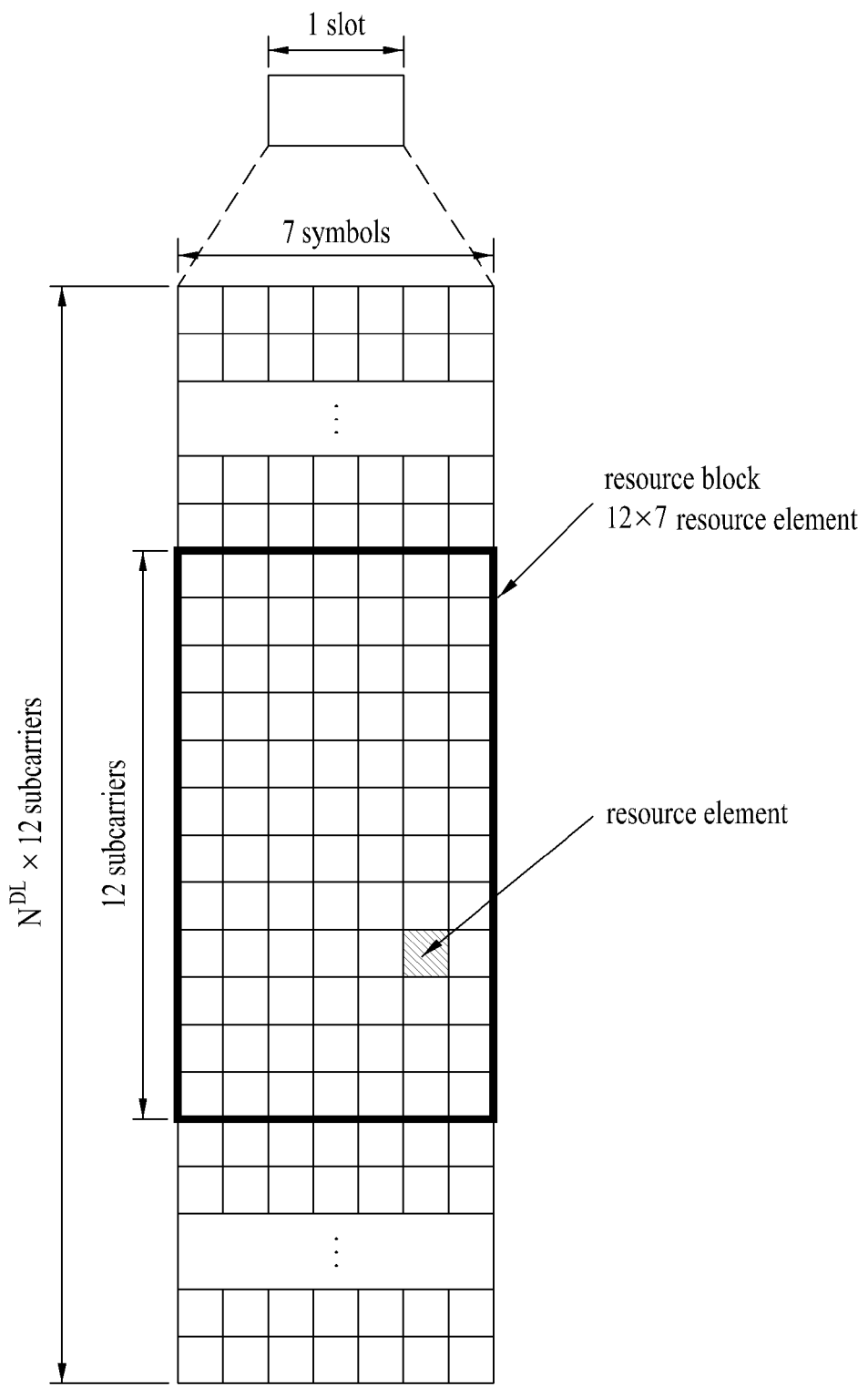
FIG. 3 is a diagram for one example of a resource grid for a downlink slot.

FIG. 3 is a diagram for an example of a resource grid for one downlink slot.

Referring to FIG. 3, one downlink slot includes a plurality of OFDM symbols in time domain. In this case, one downlink (DL) slot includes 7 OFDM symbols and one resource block (RB) includes 12 subcarriers in frequency domain, by which the present invention may be non-limited.

Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
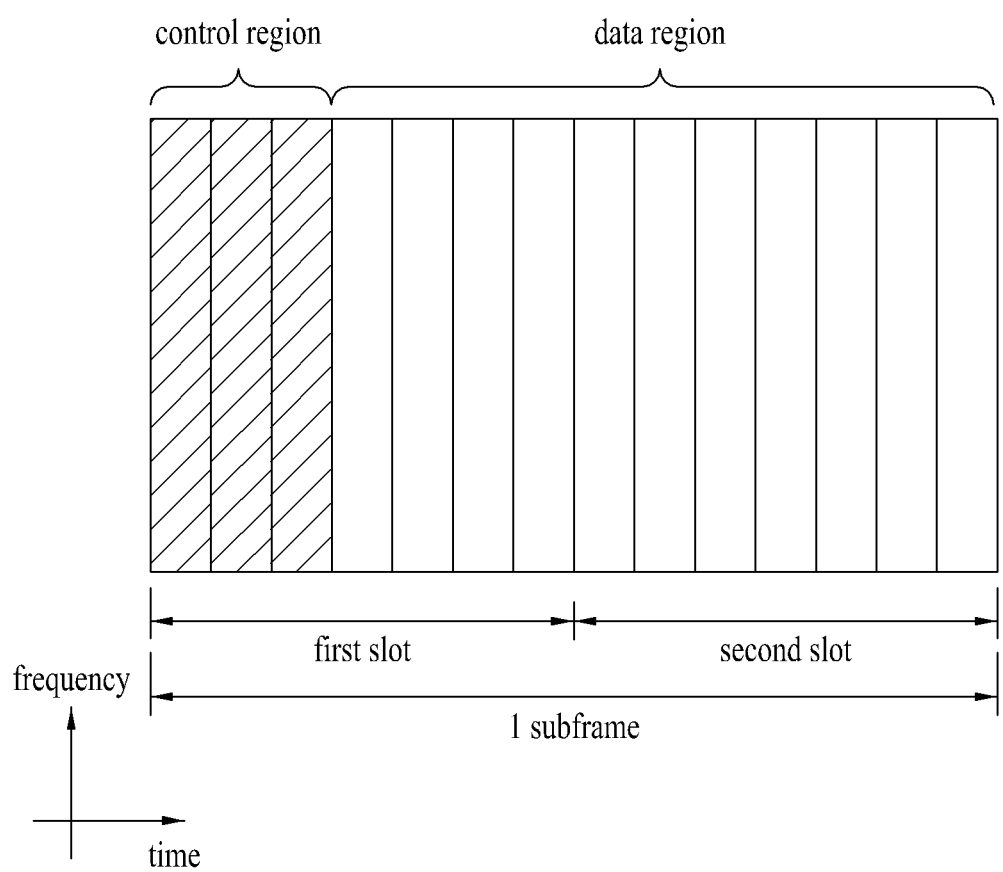
FIG. 4 is a diagram for a structure of a downlink subframe.

FIG. 4 is a diagram for a structure of a downlink subframe.

Referring to FIG. 4, Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols (i.e., a size of a control region) used for a transmission of control channels within the subframe. The PHICH is a response channel in response to UL transmission and carries ACK (acknowledgement)/NACK (not-acknowledgement) signals for a HARQ (hybrid automatic repeat request). Control information carried on PDCCH may be called downlink control information (hereinafter abbreviated DCI). The DCI may include UL resource allocation information, DL resource allocation information or a UL transmit power control command for a random UE (user equipment) group.

Figure 5:
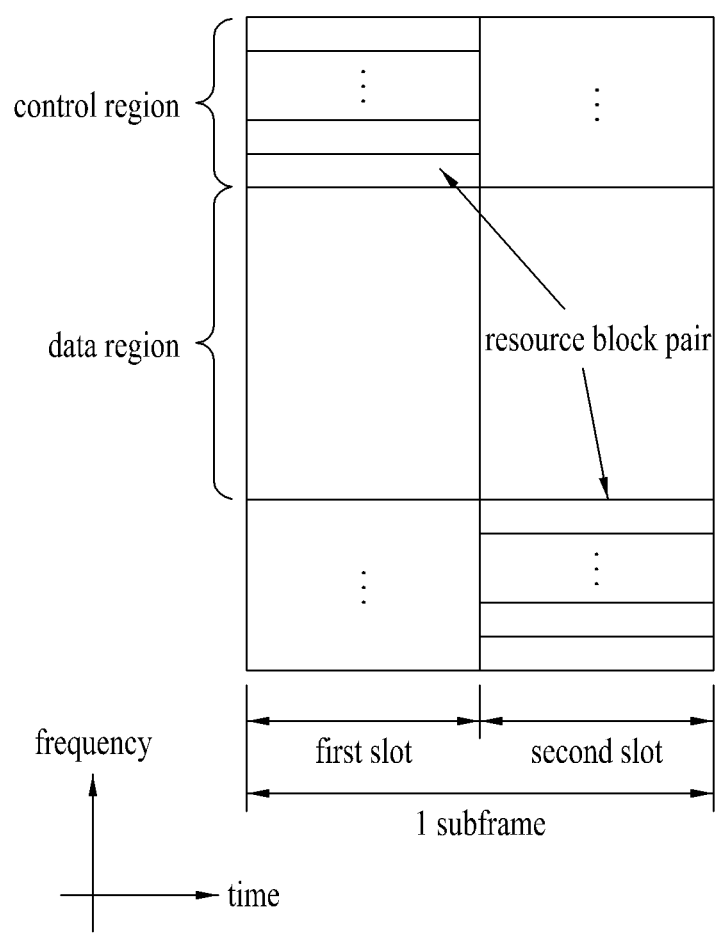
FIG. 5 is a diagram for a structure of an uplink subframe.

FIG. 5 is a diagram for a structure of an uplink subframe.

Referring to FIG. 5, a UL subframe may be divided into a control region and a data region in frequency domain. A physical UL control channel (PUCCH), which carries UL control information, is assigned to the control region. And, a physical UL shared channel (PUSCH), which carries user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Carrier Aggregation

Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. In aggregating discontinuous spectrum fragments, difficulty of implementing aggregation of the spectrum fragments depends on positions of the spectrum fragments and required total bandwidth.

Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. To this end, LTE-advanced terminals can transceive a plurality of CCs at the same time depending on capability of the terminal. When at least one carrier having a bandwidth smaller than a target band is combined, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a mandatory element. Hence, the cell may be configured with a DL resource only, a UL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an additional radio resource. In case of performing cross-carrier scheduling or in case of configuring a single UL only, PUCCH does not exist in remaining cells except the PCell, i.e., the SCell, among serving cells configured in the carrier aggregation environment.

In the following embodiment, a primary component carrier (PCC) can used as a meaning identical to the PCell and a secondary component carrier (SCC) can used as a meaning identical to the SCell.

Table 1 shows operating bands in 3GPP LTE-A system.

TABLE 1

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[Note 1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 Hz | 1844.9 MHz-1879.9 Hz | FDD |
| 10 | 1710 MHz-1770 MHz | 2110 MHz-2170 MHz | FDD |
| 11 | 1427.9 MHz-1447.9 Hz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |

Note 1:
Band 6 is not applicable.

A single E-UTRA operating band can be used for both intra-band contiguous carrier aggregation and intra-band non-contiguous carrier aggregation. On the contrary, a plurality of E-UTRA operating bands can be used for inter-band carrier aggregation. In order to help understanding of the explanation of the following description, assume that two E-UTRA operating bands are used. Yet, this is just an example. The present invention may be not limited by the example.

4 types (cases) of carrier aggregation can be classified on the basis of Table 1 shown in the above.

FIGS. 6 and 7 are diagrams for a position relation of a frequency band according to a type of carrier aggregation.

Each box shown in FIG. 6 and FIG. 7 indicates an operating band used for UL transmission or DL transmission (e.g., refer to E-UTRA operating bands shown in Table 1). In FIG. 6 and FIG. 7, $f_{UL1}$ and $f_{DL1}$ indicate an UL carrier frequency and a DL carrier frequency, respectively of a first CC. Similarly, $f_{UL2}$ and $f_{DL2}$ indicate an UL carrier frequency and a DL carrier frequency, respectively of a second CC.

Intra-band carrier aggregation can be classified into intra-band contiguous CA (FIG. 6 (*a*)) and intra-band non-contiguous CA (FIG. 6 (*b*)).

Referring to FIG. 6 (*a*), a plurality (e.g., 2) of UL carrier frequencies ($f_{UL1}$, $f_{UL2}$) are adjacent to each other in one operating band. Similarly, a plurality (e.g., 2) of DL carrier frequencies ($f_{DL1}$, $f_{DL2}$) are adjacent to each other in one operating band. On the contrary, referring to FIG. 6 (*b*), a plurality (e.g., 2) of UL carrier frequencies ($f_{UL1}$, $f_{UL2}$) are apart from each other in one operating band. Similarly, a plurality (e.g., 2) of DL carrier frequencies ($f_{DL1}$, $f_{DL2}$) are apart from each other in one operating band.

Inter-band carrier aggregation can be classified into inter-band carrier aggregation (FIG. 7 (*a*)) of which a low-band carrier and a high-band carrier including radio frequency characteristic different from each other are combined with each other and inter-band carrier aggregation (FIG. 7 (*b*)) of which similar frequency bands capable of using a common RF terminal since RF characteristic is similar to each other are combined with each other according to each CC.

Referring to FIG. 7, a plurality (e.g., 2) of UL carrier frequencies ($f_{UL1}$, $f_{UL2}$) exist on operating bands different from each other, respectively. Similarly, a plurality (e.g., 2) of DL carrier frequencies ($f_{DL2}$, $f_{DL2}$) exist on operating bands different from each other, respectively.

Figure 8:
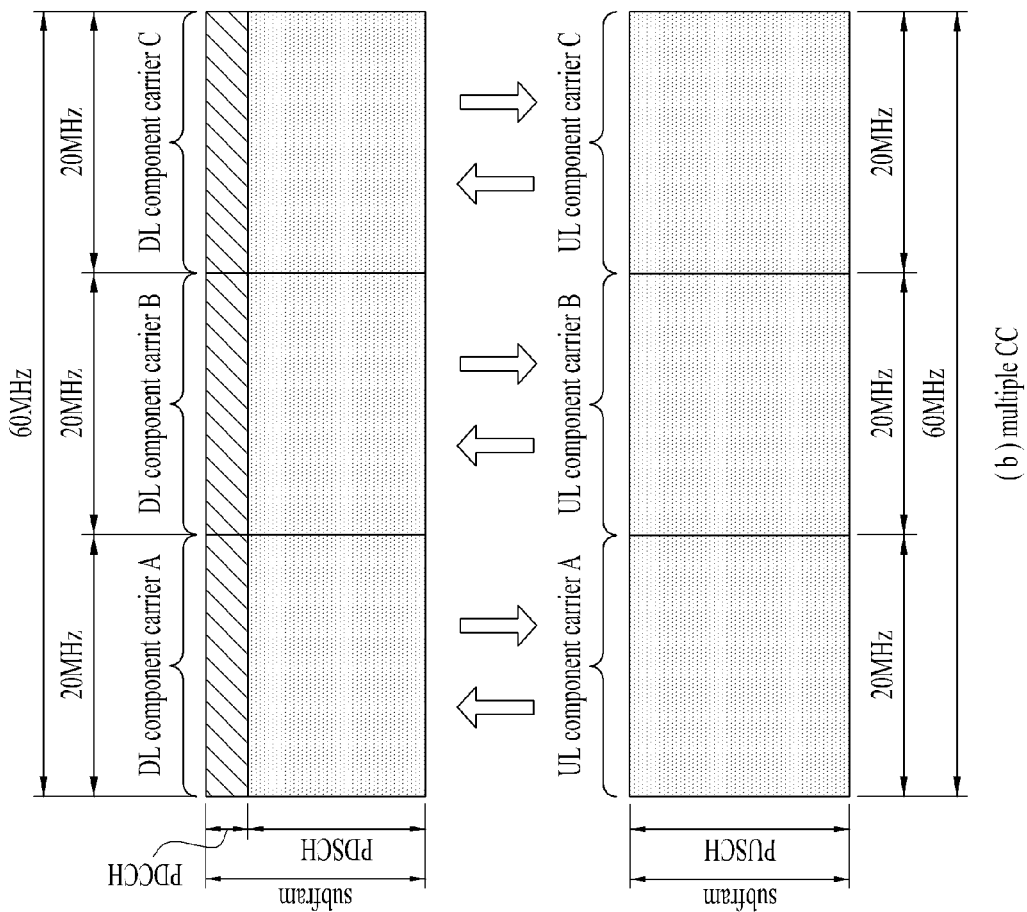
FIG. 8 is a diagram for one example of component carriers of LTE system and carrier aggregation used by LTE-A system.

FIG. 8 is a diagram for one example of component carriers of LTE system and carrier aggregation used by LTE-A system.

FIG. 8 (*a*) shows a single carrier structure used by LTE system. Component carriers include DL CC and UL CC. One component carrier may have a frequency range of maximum 20 MHz (3GPP release-11 standard specification).

FIG. 8 (B) shows a carrier aggregation structure used by LTE-A system. Referring to FIG. 8 (*b*), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, M≤N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such a higher layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

In a carrier aggregation system, there exist a self-scheduling method and a cross carrier scheduling method in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, it is necessary to have a carrier field indicator (CIF) indicating that PDSCH/PUSCH indicated by corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with the CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, a CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of a monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL CC set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 9:
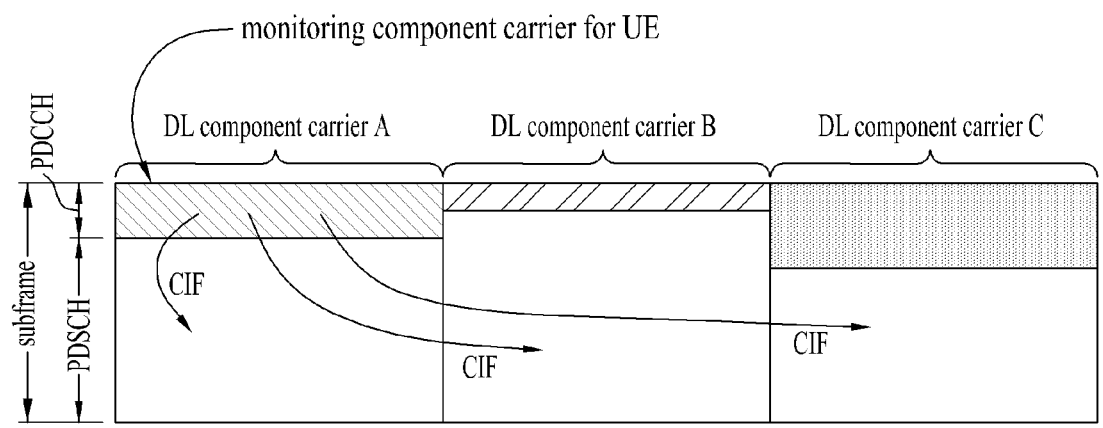
FIG. 9 is a diagram for a subframe structure of LTE-A system in accordance with cross carrier scheduling.

FIG. 9 is a diagram for a subframe structure of LTE-A system in accordance with cross carrier scheduling.

Referring to FIG. 9, a DL subframe for an LTE-A user equipment represents a case that 3 DL CCs are combined with each other and that DL CC 'A' is set as a PDCCH monitoring DL CC. If a CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' and DL CC 'C', which are not set as the PDCCH monitoring DL CC, do not transmit PDCCH.

As mentioned in the foregoing description, in a system to which carrier aggregation is applied, a user equipment can receive a plurality of PDSCHs on a plurality of DL CCs. In this case, there may exist a case that the user equipment transmits ACK/NACK for each data in a single subframe on a single UL CC. In case that a plurality of ACK/NACK are transmitted in a single subframe using PUCCH format 1a/1b, high transmit power is required, PAPR (peak-to-average power ratio) of UL transmission increases and a distance capable of being transmitted by a user equipment from eNode B may be reduced due to an inefficient use of a transmit power amplifier. In order to transmit a plurality of the ACK/NACK on a single PUCCH, it may apply ACK/NACK bundling or ACK/NACK multiplexing.

Transmission Timing Adjustments

Since orthogonality is secured between UL transmissions received from UEs different from each other positioned in a cell in LTE/LTE-A system, interference does not occur between the UL transmissions. Yet, in order to secure the UL orthogonality, time of arrival of UL signals, which are transmitted form the UEs different from each other using frequency resources different from each other in an identical subframe, should be aligned. In other word, in order to secure the orthogonality between the signals received from the UEs different from each other and in order to avoid interference between the signals, time difference between the UL signals arriving at an eNode B from the UEs different from each other should be less than a length of a cyclic prefix.

Since a distance between the UEs different from each other positioned at an identical cell and an eNode B is different from each other, difference of propagation time may occur due to the different distance. Hence, it is necessary to adjust UL transmission timing of each UE. To this end, a timing advance scheme can be used to adjust the UL transmission timing of each UE. The timing advance means an offset between a start point of a DL subframe and a UL subframe transmitted from a corresponding UE. In the aspect of a UE, the timing advance can be represented by an offset value of a negative number. For instance, since a UE positioned farther from an eNode B experiences a bigger propagation delay, the UE transmits a UL signal earlier than UEs positioned near the eNode B. By doing so, timing of signals received from UEs different from each other can be aligned in a manner of properly adjusting an offset value for each UE.

Figure 10:
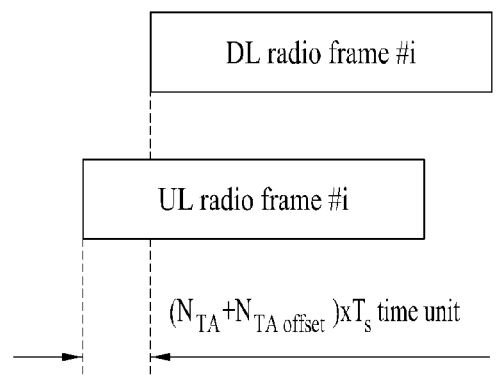
FIG. 10 is a diagram for an example of uplink-downlink frame timing.

FIG. 10 is a diagram for an example of uplink-downlink frame timing.

Referring to FIG. 10, transmission of a UL radio frame i transmitted from a UE starts earlier than transmission of a corresponding DL radio frame as much as $(N_{TA}+N_{TAoffset})*T_s$ second. According to Rel-8, 9 and 10 LTE system, the $N_{TA}$ is equal to or greater than 0 and equal to or less than 20512. In a frame structure type 1 (FDD), the $N_{TAoffset}$ corresponds to 0. In a frame structure type 2 (FDD), the $N_{TAoffset}$ corresponds to 624. If a UE receives a value of the $N_{TA}$ via a timing advance command and the like of a random access response message, the UE adjusts UL transmission timing of PUCCH/PUSCH/SRS (sounding reference signal) of a primary cell (PCell). The timing advance command indicates change of the UL timing by multiple of 16 $T_s$ on the basis of current UL timing. In this case, UL transmission timing of PUSCH/SRS of a secondary cell (SCell) may be identical to that of the primary cell.

The timing advance command $(T_A)$ included in the random access response is 11-bit. The $T_A$ indicates a value of 0, 1, 2, ..., 1282. A timing adjustment value $(N_{TA})$ is given by '$N_{TA}=T_A*16$'. Otherwise, the timing advance command $(T_A)$ is 6-bit and indicates a value of 0, 1, 2, ..., 63. A timing adjustment value $(N_{TA})$ is given by '$N_{TA,new}=N_{TA,old}+(T_A-31)*16$'

The timing advance command can be transmitted to each UE via a MAC (medium access control) control element. Regarding this, it is described with reference to FIG. 11 in the following.

Figure 11:
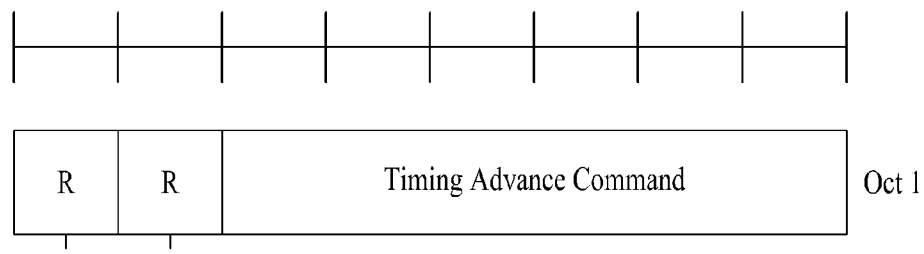
FIG. 11 is a diagram for an example of a timing advance command MAC control element.

FIG. 11 is a diagram for an example of a timing advance command MAC control element.

Referring to FIG. 11, a timing advance command MAC control element can be identified by a MAC PDU (packet data unit) sub header including an LCID (logical channel ID). The timing advance command MAC control element includes a single octet and has a fixed size.

"R" indicates a reserved bit and is set to 0. A timing advance command field indicates an index value $(T_A)$ and is used for controlling an amount of timing adjustment applied to a UE. A length of the timing advance command field corresponds to 6 bits.

A timing advance command received in a subframe n is applied from a subframe n+6. In this case, a value of the $N_{TA}$ may have a positive or negative value. The value may indicate advancing or delay of UL transmission timing according to a given value.

A timing advance command received in a subframe n is applied from a subframe n+6. If UL PUCCH/PUSCH/SRS transmission of a UE is overlapped with each other in the subframe n and a subframe n+1 due to timing adjustment, the UE completes the transmission transmitted in the subframe n and may not transmit a part overlapped in the subframe n+1.

If received DL timing is modified or the received DL timing is not compensated or partly compensated by UL timing adjustment without a timing advance command, a UE changes a value of $N_{TA}$ in accordance with the UL timing adjustment.

Random Access Response Grant

An upper layer indicates a 20-bit UL grant to a physical layer. This indicates a random access response grant in the physical layer.

From a MSB (most significant bit) to a LSB (least significant bit), 20 bits are configured as follows.
A hopping flag: 1 bit
Fixed size resource block assignment: 10 bits
Truncated modulation and coding scheme (MCS): 4 bits
Transmission power control command for scheduled PUSCH: 3 bits
UL delay: 1 bit
Channel state information (CSI) request: 1 bit If a frequency hopping (FH) field of 1 bit in a corresponding random access response grant is set to 1 and UL resource block assignment corresponds to a type 0, a UE performs a PUSCH frequency hopping. On the contrary, otherwise, the PUSCH frequency hopping is not performed. If a hopping flag is configured, the UE performs PUSCH hopping according to the indication indicated by a fixed size resource block assignment field.

The fixed size resource block assignment field is explained in the following.

First of all, if the number of UL resource blocks correspond to $N_{RB}^{UL} \leq 44$, 'b' number of LSBs are truncated from the fixed size resource block assignment and the truncated resource block assignment is interpreted according to a scheme of a regular DCI format 0. In this case, the 'b' can be represented by Formula 1 in the following.

$$b=\lceil \log_2(N_{RB}^{UL} \cdot (N_{RB}^{UL}+1)/2) \rceil \quad \text{[Formula 1]}$$

Otherwise, b number of MSBs, which are set to 0, are inserted to a next of $N_{UP\_hop}$ number of hopping bits in the fixed size resource block assignment and the extended resource block assignment is interpreted according to a scheme of a regular DCI format 0. In this case, the 'b' can be represented by Formula 2 in the following.

$$b=\lceil \log_2(N_{RB}^{UL} \cdot (N_{RB}^{UL}+1)/2) \rceil [-10] \quad \text{[Formula 2]}$$

And, the truncated modulation and coding scheme (MCS) can be interpreted as an MCS corresponding to a random access response grant.

A TPC command $(\delta_{msg2})$ is used for setting power of PUSCH and can be interpreted according to Table 2 in the following.

Table 2 indicates the TPC command $(\delta_{msg2})$ for scheduled PUSCH.

TABLE 2

| TPC Command | Value (in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, whether to include a non-periodic CQI, PMI, and RI report in a corresponding PUSCH transmission can be determined by a CSI request field. On the contrary, in a contention based random access procedure, the CSI request field is reserved.

UL delay is applied to both TDD and FDD system. In order to indicate whether to introduce PUSCH delay, the UL delay can be set to either 0 or 1.

Uplink Power Control

It is necessary for each user equipment to properly control uplink power to maximize system capacity and minimize inter-cell interference. Moreover, it is necessary to properly control uplink power to provide a same service to a user equipment positioned at the center of a cell and a user equipment positioned at a cell boundary. Specifically, as mentioned in the foregoing description, although time of arrival of uplink signals, which are transmitted from user equipment different from each other, are aligned to maintain orthogonality between cells positioned at a same cell, path loss of the signals transmitted from the user equipments may considerably vary since distance between eNode B and each user equipment is different from each other. If signals are transmitted by two user equipments with a same transmit power and an eNode B receives the signals with strength considerably different from each other according to the distance difference from the eNode B, since a strong signal may considerably interfere a weak signal, it is necessary to adjust each of the UL signals to be received with approximately same strength from the eNode B via UL power control of each of the user equipments.

In LTE-A system, UL power control schemes different from each other are defined according to a UL physical channel (e.g., PUSCH, PUCCH, SRS and the like). Yet, an identical basic principle determined by the sum of a value obtained from a static or semi-static parameter signaled by an eNode B and a dynamic offset value updated according to a subframe can be applied to all cases.

Transmit power determined according to each UL physical channel (or signal) is distributed over a transmission antenna port for a corresponding UL physical channel (or signal). In case of PUSCH, first of all, PUSCH transmit power ($\hat{P}_{PUSCH,c}(i)$) is scaled (adjusted) with a ratio of the number of antenna port configured for a PUSCH transmission scheme to the number of antenna port including non-zero PUSCH transmission. The scaled power is identically distributed over antenna ports on which the non-zero PUSCH is transmitted. In case of PUCCH or SRS, PUCCH transmit power ($\hat{P}_{PUCCH}(i)$)) or SRS transmit power ($\hat{P}_{SRS,c}(i)$) is identically distributed over antenna ports configured for the PUCCH or the SRS. The $\hat{P}_{SRS,c}(i)$ indicates a linear value of $P_{SRS,c}(i)$.

In the following, a method of controlling transmit power is explained in detail according to each UL physical channel (or signal).

1) PUSCH (Physical Uplink Shared Channel)

PUSCH transmit power of a user equipment is configured as follows.

In case that the user equipment does not transmit PUCCH and PUSCH at the same time in a serving cell (c), PUSCH transmit power ($\hat{P}_{PUSCH,c}(i)$) of the user equipment in a subframe i of the serving cell (c) is determined as Formula 3 in the following.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm] \quad \text{[Formula 3]}$$

And, in case that the user equipment transmits PUCCH and PUSCH at the same time in the serving cell (c), the PUSCH transmit power ($\hat{P}_{PUSCH,c}(i)$) of the user equipment in the subframe i of the serving cell (c) is determined as Formula 4 in the following.

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm] \quad \text{[Formula 4]}$$

In Formula 3 and 4, $P_{CMAX,c}(i)$ indicates maximum transmit power of the user equipment in the subframe i of the serving cell (c) and $\hat{P}_{CMAX,c}(i)$ indicates a linear value of $P_{CMAX,c}(i)$. $\hat{P}_{PUCCH}(i)$ indicates a linear value of $P_{PUCCH}(i)$. $M_{PUSCH,c}(i)$ corresponds to a parameter indicating a bandwidth of PUSCH resource allocation represented by the number of resource blocks valid in the subframe i of the serving cell (c). This parameter corresponds to a value allocated by an eNode B.

$P_{O\_PUSCH,c}(j)$ corresponds to a parameter configured by the sum of a cell-specific nominal component $P_{O\_NOMINAL\_PUSCH,c}(j)$ provided from a upper layer and a UE-specific component $P_{O\_UE\_PUSCH,c}(j)$ provided by the upper layer for the serving cell (c). An eNode B informs a user equipment of this parameter. In this case, in case of PUSCH (re)transmission corresponding to a semi-persistent grant, j equals to 0. In case of PUSCH (re)transmission corresponding to a dynamic scheduled grant, j equals to 1. In case of PUSCH (re)transmission corresponding to a random access response grant, j equals to 2. If the j equals to 2, it may be represented as $P_{O\_UE\_PUSCH,c}(2)=0$. $P_{O\_NOMINAL\_PUSCH,c}(2)$ is defined as Formula 5 in the following.

$$P_{O\_NOMINAL\_PUSCH,c}(2) = P_{O\_PRE} + \Delta_{PREAMBLE\_Msg3} \quad \text{[Formula 5]}$$

In Formula 5, "preambleInitialReceivedTargetPower" parameter ($P_{O\_PRE}$) and $\Delta_{PREAMBLE\_Msg3}$ are signaled by an upper layer.

$\alpha_c(j)$ is a 3-bit cell-specific parameter transmitted by an eNode B in a manner of being determined by an upper layer in consideration of path loss (PL) discord between an UL channel and a DL channel. If j equals to 0 or 1, it may be represented as $\alpha_c \in \{0, 0.4, 0.5, 0.6, 0.7, 0.8, 0.9, 1\}$. If the j equals to 2, the $\alpha_c(j)$ corresponds to 1.

$PL_c$ corresponds to a DL path loss estimation calculated by a user equipment in dB unit in the serving cell (c). The $PL_c$ is determined by 'referenceSignalPower—higher layer filtered RSRP'. In this case, the "referenceSignalPower" parameter is provided by a higher layer and the higher layer filtered RSRP is configured by a higher layer parameter "pathlossReferenceLinking".

$\Delta_{TF,c}(i)$ is called an MCS compensation parameter or a transport format (TF) compensation parameter. If $K_S$ equals to 1.25, this parameter is determined as Formula 6 in the following. If the $K_S$ equals to 0, this parameter corresponds to 0. In this case, if the $K_S$ equals to 0, it corresponds to a transmission mode 2. The $K_S$ is determined by a parameter "deltaMCS-Enabled" provided by a higher layer for each serving cell (c).

$$\Delta_{TF,c}(i) = 10\log_{10}((2^{BPRE \cdot K_s} - 1) \cdot \beta_{offset}^{PUSCH}) \quad \text{[Formula 6]}$$

In case of a control data, bits per resource element (BPRE) corresponds to $BPRE = O_{CQI}/N_{RE}$. Otherwise, the BPRE corresponds to $$\sum_{r=0}^{C-1} K_r/N_{RE}.$$

In this case, C, $K_r$, $O_{CQI}$ and $N_{RE}$ indicate the number of code blocks, a size of a code block (r), the number of CQI/PMI bits including CRC bit number and the number of resource element determined by $N_{RE} = M_{sc}^{PUSCH-initial} \cdot N_{symb}^{PUSCH-initial}$, respectively. If the control data is transmitted on PUSCH without UL-SCH data, it may be represented as $\beta_{offset}^{PUSCH} = \beta_{offset}^{CQI}$. Otherwise, $\beta_{offset}^{PUSCH}$ may correspond to 1.

$f_c(i)$ means a current PUSCH power control adjustment state for the serving cell (c) and can be determined by $\delta_{PUSCH,c}$ named as a correction value or a TPC command. The $\delta_{PUSCH,c}$ may be included in PDCCH having a DCI format 0/4 for the serving cell (c) or can be joint coded with different TPC commands in PDCCH having DCI format 3/3A. In this case, a CRC parity bit of the DCI format 3/3A is scrambled by TPC-PUSCH-RNTI.

Compared to a previous transmit power, the $f_c(i)$ can be determined by a relative power value or an absolute power value irrespective of the previous transmit power.

First of all, a case that the $f_c(i)$ is determined by a relative power value is explained.

If accumulation is enabled based on an "Accumulation-enabled" parameter provided by a higher layer or a TPC command ($\delta_{PUSCH,c}$) is included in PDCCH having a DCI format 0 (CRC parity bit is scrambled by a temporary C-RNTI) for the serving cell (c), the $f_c(i)$ is defined as Formula 7 in the following.

$$f_c(i)=f_c(i-1)+\delta_{PUSCH,c}(i-K_{PUSCH}) \quad \text{[Formula 7]}$$

In Formula 7, $\delta_{PUSCH,c}(i-K_{PUSCH})$ is signaled via PDCCH having a DCI format 0/4 or 3/3A in i-$K_{PUSCH}$ subframe and $f_c(0)$ indicates an initial value after resetting or accumulation.

In case of a FDD system, a $K_{PUSCH}$ value corresponds to 4. In case of a TDD system, if UL/DL configuration corresponds to 1 to 6, it may follow Table 3 in the following.

Table 3 indicates a $K_{PUSCH}$ value in TDD configuration 0 to 6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Yet, when the UL/DL configuration corresponds to 0 in the TDD system, if PUSCH transmission is scheduled in a subframe number 2 or 7 via PDCCH having a DCI format 0/4 in which an LSB of an UL index is set to 1, $K_{PUSCH}$ corresponds to 7. Otherwise, the $K_{PUSCH}$ follows Table 3 shown in the above.

A user equipment attempts to decode PDCCH of DCI format 0/4 having C-RNTI (cell-RNTI) of the user equipment, PDCCH of DCI format 0 having SPS (semi-persistent scheduling) C-RNTI or PDCCH of DCI format 3/3A having TPC-PUSCH-RNTI of the user equipment in every subframe except DRX (discontinuous reception).

If both DCI format 0/4 for a serving cell and DCI format 3/3A are detected in an identical subframe, the user equipment uses $\delta_{PUSCH,c}$ provided in the DCI format 0/4.

In case of a subframe in which a TPC command is not decoded for the serving cell (c), a subframe in which the DRX has occurred or a subframe not corresponding to a UL subframe in the TDD system, the $\delta_{PUSCH,c}$ corresponds to 0 (dB).

An accumulation value of the $\delta_{PUSCH,c}$ (dB) signaled via PDCCH having DCI format 0/4 is shown in Table 4 in the following. Yet, in order for the PDCCH having DCI format 0 to be validated as an SPS activation PDCCH or an SPS cancellation PDCCH, the $\delta_{PUSCH,c}$ corresponds to 0 (dB).

And, an accumulation value of the $\delta_{PUSCH,c}$ (dB) signaled via PDCCH having DCI format 3/3A corresponds to one of a SET 1 given in Table 4 in the following and a SET 2 given in Table 5 in the following. The accumulation value is determined by "TPC-Index" parameter provided by a higher layer.

If transmit power of a user equipment arrives at $P_{CMAX,c}$ for the serving cell (c), a positive TPC command for the serving cell (c) is not accumulated. And, if the transmit power of the user equipment arrives at a minimum value, a negative TPC command is not accumulated.

In case of the serving cell (c), a user equipment resets accumulation when a $P_{O\_UE\_PUSCH,c}$ value is modified by a higher layer. In case of a primary cell, the user equipment can reset the accumulation when a random access response message is received.

Table 4 shows a mapping relation between TPC command field of DCI format 0/3/4 and absolute $\delta^{PUSCH,c}$ or accumulated $\delta_{PUSCH,c}$.

TABLE 4

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

Table 5 shows a mapping relation between a TPC command field of a DCI format 3A and accumulated $\delta_{PUSCH,c}$.

TABLE 5

| TPC Command Field in DCI format 3A | Accumulated $\delta_{PUSCH,c}$ [dB] |
|---|---|
| 0 | −1 |
| 1 | 1 |

In the following, a case that $f_c(i)$ is determined by an absolute power value is explained.

If accumulation is not enabled by an "Accumulation-enabled" parameter provided by a higher layer, the $f_c(i)$ is defined as Formula 8 in the following.

$$f_c(i)=\delta_{PUSCH,c}(i-K_{PUSCH}) \quad \text{[Formula 8]}$$

In Formula 8, $\delta_{PUSCH,c}(i-K_{PUSCH})$ is signaled via PDCCH having DCI format 0/4 in i-$K_{PUSCH}$ subframe for a serving cell (c).

In case of a FDD system, a $K_{PUSCH}$ value corresponds to 4. In case of a TDD system, if UL/DL configuration corresponds to 1 to 6, it may follow Table 3 shown in the above.

Yet, when the UL/DL configuration corresponds to 0 in the TDD system, if PUSCH transmission is scheduled in a subframe number 2 or 7 via PDCCH having DCI format 0/4 in which an LSB of an UL index is configured by 1, $K_{PUSCH}$ corresponds to 7. Otherwise, the $K_{PUSCH}$ may follow Table 3 shown in the above.

An absolute value of $\delta_{PUSCH,c}$ (dB) signaled via PDCCH having DCI format 0/4 is shown in Table 4 in the above. Yet, in order for the PDCCH having DCI format 0 to be validated as an SPS activation PDCCH or an SPS cancellation PDCCH, the $\delta_{PUSCH,c}$ corresponds to 0 (dB).

In case of a subframe in which PDCCH having DCI format 0/4 is not decoded for the serving cell (c), a subframe in which DRX has occurred or a subframe not corresponding to a UL subframe in the TDD system, it may be represented as $f_c(i)=f_c(i-1)$.

An initial value $f_c(*)$ of two types (accumulated value or current absolute value) of the aforementioned PUSCH power control adjustment state is configured as follows.

If a $P_{O\_UE\_PUSCH,c}$ value is modified by a higher layer and a serving cell (c) corresponds to a primary cell or if the $P_{O\_UE\_PUSCH,c}$ value is received by the higher layer and the serving cell (c) corresponds to a secondary cell, it may be represented as $f_c(0)=0$.

Otherwise, if the serving cell (c) corresponds to the primary cell, it may be represented as $f_c(0)=\Delta P_{rampup}+\delta_{msg2}$. In this case, $\delta_{msg2}$ indicates a TPC command indicated by a random access response. $\Delta P_{rampup}$ is provided by a higher layer and corresponds to a ramp-up of total power from an initial preamble to a last preamble.

If total transmit power of a user equipment used for transmitting PUSCH, which is determined according to the aforementioned scheme, exceeds $\hat{P}_{CMAX}(i)$, the user equipment scales $\hat{P}_{PUSCH,c}(i)$ for the serving cell (c) to satisfy Formula 9 in the following in a subframe i.

$$\sum_c w(i) \cdot \hat{P}_{PUSCH,c}(i) \leq (\hat{P}_{CMAX}(i) - \hat{P}_{PUCCH}(i)) \quad \text{[Formula 9]}$$

In this case, $\hat{P}_{PUCCH}(i)$ indicates a linear value of $\hat{P}_{PUCCH}(i)$, $\hat{P}_{PUSCH,c}(i)$ indicates a linear value of $P_{PUSCH,c}(i)$ and $\hat{P}_{CMAX}(i)$ indicates a linear value of $P_{CMAX}$ corresponding to the total maximum output power set to the user equipment in the subframe i. w(i) (0≤w(i)≤1) means a scaling factor of the $\hat{P}_{PUSCH,c}(i)$ for the serving cell (c). If there is no PUCCH transmission in the subframe i, the $\hat{P}_{PUSCH,c}(i)$ corresponds to 0.

When a user equipment transmits PUSCH including UL control information (UCI) in a serving cell (j) and transmits PUSCH not including the UCI in a remaining serving cell, if total transmit power of the user equipment exceeds $\hat{P}_{CMAX}(i)$, the user equipment scales the $\hat{P}_{PUSCH,c}(i)$ to satisfy Formula 10 in the following in the subframe i for a serving cell not including the UCI.

$$\sum_{c \neq j} w(i) \cdot \hat{P}_{PUSCH,c}(i) \leq (\hat{P}_{CMAX}(i) - \hat{P}_{PUSCH,j}(i)) \quad \text{[Formula 10]}$$

In this case, $\hat{P}_{PUSCH,j}(i)$ indicates PUSCH transmit power in a cell including UCI and w(i) means a scaling factor of the $\hat{P}_{PUSCH,j}(i)$ for a serving cell (c) not including the UCI. If it is $$\sum_{c \neq j} w(i) \cdot \hat{P}_{PUSCH,c}(i) = 0$$

and the total transmit power of the user equipment does not exceed the $\hat{P}_{CMAX}(i)$, power scaling is not applied to the $\hat{P}_{PUSCH,j}(i)$. If the w(i) is greater than 0, a value of the w(i) is identical to each other over the serving cell. Yet, the w(i) may have a value of 0 for a specific serving cell.

If a user equipment transmits PUCCH and PUSCH at the same time in a manner of including UCI in a serving cell (j), the user equipment transmits PUSCH in remaining serving cells without the UCI and the total transmit power of the user equipment exceeds the $\hat{P}_{CMAX}(i)$, the user equipment obtains $\hat{P}_{PUSCH,c}(i)$ in accordance with Formula 11 and 12 in the following.

$$\hat{P}_{PUSCH,j}(i) = \min(\hat{P}_{PUSCH,j}(i), (\hat{P}_{CMAX}(i) - \hat{P}_{PUCCH}(i))) \quad \text{[Formula 11]}$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i)) \quad \text{[Formula 12]}$$

In the following, a power headroom is explained.

In order for an eNode B to appropriately schedule UL transmission resources for a plurality of user equipment, each of a plurality of the user equipments reports available power headroom information to the eNode B and the eNode B can use a power headroom report (PHR) received from each of a plurality of the user equipments to determine a UL bandwidth usable by each user equipment according to a subframe. This method can prevent each user equipment from being allocated by an unnecessary UL resource in a manner of properly distributing UL resources allocated to a plurality of the user equipments.

A range of the power headroom report may have a range ranging from 40 dB to −23 dB in 1 dB unit. In this case, in the power headroom report range, a range of a 'negative' value indicates a range that each user equipment is able to transmit a signal to an eNode B using transmit power greater than transmit power allocated via a UL grant.

The power headroom report makes the eNode B reduce a size (i.e., the number of RBs on frequency domain) of a next UL grant and may cancel a transmission resource to be allocated to different user equipments. The power headroom report can be transmitted in a subframe in which a user equipment has a UL transmission grant. In particular, the power headroom report relates to a subframe in which the power headroom report is transmitted.

In LTE-A system, two types of power headroom report (PHR) are defined. A power headroom (PH) of a user equipment is valid in a subframe i of a serving cell (c).

A type 1 of the PHR is explained. When a user equipment transmits PUSCH only without PUCCH in the subframe i of the serving cell (c), a power headroom according to the type 1 report is calculated according to Formula 13 in the following.

$$PH_{type1,c}(i) = P_{CMAX,c} - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad \text{[Formula 13]}$$

Since definition on parameters including $P_{CMAX,c}$, $M_{PUSCH,c}(i)$, $P_{O\_PUSCH,c}(j)$, $\alpha_c(j)$, $PL_c$, $\Delta_{TF,c}(i)$ and $f_c(i)$ used in Formula 13 is identical to what is mentioned earlier, it is omitted at this time.

And, when the user equipment transmits PUSCH together with PUCCH in the subframe i of the serving cell (c), the power headroom according to the type 1 report is calculated according to Formula 14 in the following.

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad \text{[Formula 14]}$$

Since definition on parameters including $M_{PUSCH,c}(i)$, $P_{O\_PUSCH,c}(j)$, $\alpha_c(j)$, $PL_c$, $\Delta_{TF,c}(i)$ and $f_c(i)$ used in Formula 14 is identical to what is mentioned earlier, it is omitted at this time. $\tilde{P}_{CMAX,c}(i)$ is calculated under an assumption that PUSCH is transmitted only in the subframe i. In this case, a physical layer delivers $\tilde{P}_{CMAX,c}(i)$ instead of $P_{CMAX,c}(i)$ to a higher layer.

And, when the user equipment does not transmit PUSCH in the subframe i of the serving cell (c), the power headroom according to the type 1 report is calculated according to Formula 15 in the following.

$$PH_{type1,c}(i) = \tilde{P}_{CMAX,c}(i) - \{P_{O\_PUSCH,c}(1) + \alpha_c(1) \cdot PL_c + f_c(i)\}[dB] \quad \text{[Formula 15]}$$

In Formula 15, $\tilde{P}_{CMAX,c}(i)$ is calculated under an assumption that MPR(Maximum Power Reduction)=0 (dB), A-MPR (Additional Maximum Power Reduction)=0 (dB), P-MPR (Power Management Maximum Power Reduction)=0 (dB), $T_C$=0 (dB). Since definition on parameters including $P_{O\_PUSCH,c}(1)$, $\alpha_c(1)$, $PL_c$ and $f_c(i)$ used in Formula 15 is identical to what is mentioned earlier, it is omitted at this time.

A type 2 of the PHR is explained in the following.

When a user equipment transmits PUCCH and PUSCH at the same time in a subframe i of a primary cell (PCell), a power headroom according to a type 2 report is calculated as shown in Formula 16 in the following.

$$PH_{type2}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH} + PL_c + h(n_{CQI}, n_{HARQ}, n_{SR}) + \Delta_{F\_PUCCH}(F) + \Delta_{TxD}(F') + g(i))/10}\right)[dB] \quad \text{[Formula 16]}$$

Since definition on parameters including $P_{CMAX,c}$, $M_{PUSCH,c}(i)$, $P_{O\_PUSCH,c}(j)$, $\alpha_c(j)$, $\Delta_{TF,c}(i)$, $f_c(i)$, $P_{O\_PUCCH}$, $PL_c$, $h(n_{CQI}, n_{HARQ}, n_{SR})$, $\Delta_{F\_PUCCH}(F)$ and $\Delta_{TxD}(F')$ used in Formula 16 is identical to what is mentioned earlier, it is omitted at this time.

And, when the user equipment transmits PUSCH only in the subframe i of the primary cell (PCell) without PUCCH, the power headroom according to the type 2 report is calculated as shown in Formula 17 in the following.

$$PH_{type2}(i) = P_{CMAX,c}(i) - 10\log_{10}\left( \begin{array}{l} 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH} + PL_c + g(i))/10} \end{array} \right) [dB] \quad \text{[Formula 17]}$$

Since definition on parameters including $P_{CMAX,c}(i)$, $M_{PUSCH,c}(i)$, $P_{O\_PUSCH,c}(j)$, $\alpha_c(j)$, $\Delta_{TF,c}(i)$, $f_c(i)$, $P_{O\_PUCCH}$, $PL_c$ and $g(i)$ used in Formula 17 is identical to what is mentioned earlier, it is omitted at this time.

When the user equipment transmits PUCCH only in the subframe i of the primary cell (PCell) without PUSCH, the power headroom according to the type 2 report is calculated as shown in Formula 18 in the following.

$$PH_{type2}(i) = P_{CMAX,c}(i) - 10\log_{10}\left( \begin{array}{l} 10^{(P_{O\_PUSCH,c}(1) + PL_c + f_c(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{array} \right) [dB] \quad \text{[Formula 18]}$$

Since definition on parameters including $P_{O\_PUSCH,c}(1)$, $\alpha_c(1)$, $K_{PUSCH}$, $f_c(i)$, $P_{CMAX,c}(i)$, $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ used in Formula 18 is identical to what is mentioned earlier, it is omitted at this time.

When the user equipment does not transmit PUCCH or PUSCH in the subframe i of the primary cell (PCell), the power headroom according to the type 2 report is calculated as shown in Formula 19 in the following.

$$PH_{type2}(i) = \tilde{P}_{CMAX,c}(i) - \quad \text{[Formula 19]}$$
$$10\log_{10}\left( \begin{array}{l} 10^{(P_{O\_PUSCH,c}(1) + \alpha_c(1) \cdot PL_c + f_c(i))/10} + \\ 10^{(P_{0\_PUCCH} + PL_c + g(i))/10} \end{array} \right)[dB]$$

In Formula 19, $\tilde{P}_{CMAX,c}(i)$ is calculated under an assumption that MPR=0 (dB), A-MPR=0 (dB), P-MPR=0 (dB) and TC=0 (dB). Since definition on parameters including $P_{CMAX,c}$, $P_{O\_PUSCH,c}(1)$, $\alpha_c(1)$, $K_{PUSCH}$, $f_c(i)$, $P_{O\_PUCCH}$, $PL_c$ and $g(i)$ used in Formula 19 is identical to what is mentioned earlier, it is omitted at this time.

A range of a power headroom report can be round off by a nearest value in the range ranging from 40 dB to −23 dB in 1 dB unit. This value is delivered to a higher layer by a physical layer.

2) PUCCH (Physical Uplink Control Channel)

When a serving cell (c) corresponds to a primary cell, configuration of transmit power $P_{PUCCH}$ used for transmitting PUCCH in a subframe i by a user equipment is defined as Formula 20 shown in the following.

In Formula 20, $P_{CMAX,c}(i)$ indicates maximum transmit power of the user equipment in the subframe i of the serving cell (c) and $\Delta_{F\_PUCCH}(F)$ is provided by a higher layer. Each $\Delta_{F\_PUCCH}(F)$ value is in accord with a PUCCH format (F) commensurate with a PUCCH format 1a.

If a user equipment is configured to transmit PUCCH via two antenna ports by a higher layer, a $\Delta_{TxD}(F')$ value is provided by the higher layer. Otherwise, the $\Delta_{TxD}(F')$ value corresponds to 0.

$h(n_{CQI}, n_{HARQ}, n_{SR})$ is a value according to a PUCCH format. In this case, $n_{CQI}$ corresponds to the number of information bits for CQI. When the user equipment does not have any transport block related to UL-SCH, if the subframe i is configured for a schedule request (SR), $n_{SR}$ corresponds to 1. Otherwise, the $n_{SR}$ corresponds to 0. If a single serving cell is set to the user equipment, $n_{HARQ}$ means the number of HARQ bits transmitted in the subframe i. Otherwise, the $n_{HARQ}$ is defined as follows.

In case of PUCCH format 1, 1a, and 1b, $h(n_{CQI}, n_{HARQ}, n_{SR})$ corresponds to 0.

In case of PUCCH format 1b having channel selection, if one or more serving cells are set to the user equipment, it may be represented as $$h(n_{CQI}, n_{HARQ}, n_{SR}) = \frac{(n_{HARQ} - 1)}{2}.$$

Otherwise, $h(n_{CQI}, n_{HARQ}, n_{SR})$ corresponds to 0.

In case of PUCCH format 2, 2a and 2b and a normal CP, it may be represented as $$h(n_{CQI}, n_{HARQ}, n_{SR}) = \begin{cases} 10 \log_{10}\left(\frac{n_{CQI}}{4}\right) & \text{if } n_{CQI} \geq 4 \\ 0 & \text{otherwise} \end{cases}.$$

In case of PUCCH format 2 and an extended CP, it may be represented as $$h(n_{CQI}, n_{HARQ}, n_{SR}) = \begin{cases} 10 \log_{10}\left(\frac{n_{CQI} + n_{HARQ}}{4}\right) & \text{if } n_{CQI} + n_{HARQ} \geq 4 \\ 0 & \text{otherwise} \end{cases}.$$

$$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases}[dB] \quad \text{[Formula 20]}$$

In case of PUCCH format 3, if the user equipment is configured to transmit PUCCH via two antenna ports by a higher layer or if the user equipment transmits HARQ/SR bits greater than 11 bits, it may be represented $$h(n_{CQI}, n_{HARQ}, n_{SR}) = \frac{n_{HARQ} + n_{SR} - 1}{3}.$$

as Otherwise, it may be represented as $$h(n_{CQI}, n_{HARQ}, n_{SR}) = \frac{n_{HARQ} + n_{SR} - 1}{2}.$$

$P_{O\_PUCCH}$ is configured by the sum of a cell-specific nominal component $P_{O\_NOMINAL\_PUCCH}$ provided by a higher layer and a UE-specific component $P_{O\_UE\_PUCCH}$ provided by the higher layer.

g(i) means a current PUCCH power control adjustment state and can be determined by $\delta_{PUCCH}$ which is called a UE-specific correction value or a TPC command. The $\delta_{PUCCH}$ is transmitted in a manner of being included in PDCCH having a DCI format 1A/1B/1D/1/2A/2/2B/2C for a primary cell or being joint coded with different UE-specific PUCCH correction values in PDCCH having a DCI format 3/3A. In this case, a CRC parity bit of the DCI format 3/3A is scrambled by TPC-PUSCH-RNTI.

A user equipment attempts to decode PDCCH of DCI format 3/3A having TPC-PUSCH-RNTI of the user equipment and one or more PDCCHs of DCI format 1A/1B/1D/1/2A/2/2B/2C having C-RNTI or SPS C-RNTI of the user equipment in every subframe except DRX (discontinuous reception).

If the user equipment decodes the PDCCH having the DCI format 1A/1B/1D/1/2A/2/2B/2C in the primary cell and a detected RNTI corresponds to the C-RNTI or the SPS C-RNTI of the user equipment, the user equipment can use the $\delta_{PUCCH}$ provided by the PDCCH except a case that a TPC field in the DCI format is used for determining a PUCCH resource. Or, if the user equipment decodes the PDCCH having the DCI format 3/3A, the user equipment can use the $\delta_{PUCCH}$ provided by the PDCCH. Otherwise, the user equipment can set the $\delta_{PUCCH}$ to 0 (dB).

g(i) is defined as Formula 21 in the following. The g(i) means an initial value after resetting.

$$g(i) = g(i-1) + \sum_{m=0}^{M-1} \delta_{PUCCH}(i - k_m) \qquad \text{[Formula 21]}$$

In case of a FDD system, M equals to 1 and $k_0$ equals to 4.

A value of the $\delta_{PUCCH}$ (dB) signaled via PDCCH having the DCI format 1A/1B/1D/1/2A/2/2B/2C is shown in Table 6 in the following. If the PDCCH having DCI format 1/1A/2/2A/2B/2C is validated as an SPS activation PDCCH or if the PDCCH having DCI format 1A is validated as an SPS cancellation PDCCH, the $\delta_{PUSCH,c}$ corresponds to 0 (dB).

A value of the $\delta_{PUSCH,c}$ signaled by the PDCCH having the DCI format 3/3A is shown in Table 6 or Table 7 in the following. The value is semi-statically configured by a higher layer.

If a value of $P_{O\_UE\_PUCCH}$ is modified by a higher layer, g(0) corresponds to 0. Otherwise, it may be represented as g(0)=$\Delta P_{rampup}$+$\delta_{msg2}$. In this case, $\delta_{msg2}$ is a TPC command indicated by a random access response. $\Delta P_{rampup}$ is provided by a higher layer and corresponds to a ramp-up of total power from an initial preamble to a last preamble.

If transmit power of a user equipment, which is determined according to the aforementioned scheme, arrives at $P_{CMAX,c}$, a positive TPC command for a primary cell is not accumulated. And, if the transmit power of the user equipment arrives at a minimum power, a negative TPC command is not accumulated.

When a value of the $P_{O\_UE\_PUCCH}$ is modified by a higher layer or a user equipment receives a random access response message, accumulation can be reset.

In a TDD system, if a subframe i does not correspond to a UL subframe, it may be represented as g(i)=g(i−1)

Table 6 shows a mapping relation between a TPC command field of DCI format 1A/1B/1D/1/2A/2B/2C/2/3 and a value of $\delta_{PUCCH}$.

TABLE 6

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

Table 7 shows a mapping relation between a TPC command field of DCI format 3A and a value of $\delta_{PUCCH}$.

TABLE 7

| TPC Command Field in DCI format 3A | $\delta_{PUCCH}$ [dB] |
|---|---|
| 0 | −1 |
| 1 | 1 |

2) SRS (Sounding Reference Symbol)

Transmit power $P_{SRS}$ of a user equipment used for transmitting an SRS in a subframe i of a serving cell (c) is defined as Formula 22 in the following.

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}[dB] \qquad \text{[Formula 22]}$$

In Formula 22, $P_{CMAX,c}(i)$ indicates maximum transmit power of the user equipment in the subframe i of the serving cell (c). $P_{SRS\_OFFSET,c}(m)$ is a 4-bit parameter semi-statically configured for the serving cell (c) by a higher layer. If a trigger type for SRS transmission corresponds to 0, m equals to 0. If the trigger type corresponds to 1, m equals to 1. If $K_s$ equals to 1.25, $P_{SRS\_OFFSET,c}(m)$ is determined in a range ranging from 12 dB to −3 dB in 1 dB unit. If $K_s$ equals to 0, the $P_{SRS\_OFFSET,c}(m)$ is determined in a range ranging from 12 dB to −10.5 dB in 1.5 dB unit.

$M_{SRS,c}$ indicates a bandwidth of an SRS transmitted in the subframe i of the serving cell (c). The $M_{SRS,c}$ is represented by the number of resource blocks.

$f_c(i)$ indicates a current PUSCH power control adjustment state for the serving cell (c). Since explanation on the $f_c(i)$ is identical to what is mentioned earlier, it is omitted at this time. In this case, j equals to 1.

If total transmit power of a user equipment used for transmitting the SRS, which is determined according to the aforementioned scheme, exceeds $\hat{P}_{CMAX}(i)$, the user equipment scales $\hat{P}_{PUSCH,c}(i)$ for the serving cell (c) in a subframe i to satisfy Formula 23 in the following.

$$\sum_c w(i) \cdot \hat{P}_{SRS,c}(i) \le \hat{P}_{CMAX}(i) \qquad \text{[Formula 23]}$$

In this case, $\hat{P}_{SRS,c}(i)$ indicates a linear value of $P_{SRS,c}(i)$ and $\hat{P}_{CMAX}(i)$ indicates a linear value of total maximum output power $P_{CMAX}$ set to the user equipment in the subframe i. w(i) (0<w(i)≤1) means a scaling factor of the $\hat{P}_{SRS,c}(i)$ for the serving cell (c). A value of the w(i) is identical to each other over the serving cell.

Transmit Power

Maximum output power of a user equipment is determined as follows.

In case of a UE power class 3, MPR (maximum power reduction) granted for the maximum output power is specified in the following Table 8 based on higher order modulation and transmission bandwidth configuration (resource blocks).

Table 8 shows an example of MPR in the power class 3.

TABLE 8

| Modulation | Channel bandwidth/Transmission bandwidth (RB) | | | | | | MPR (dB) |
|---|---|---|---|---|---|---|---|
| | 1.4 MHz | 3.0 MHz | 5 MHz | 10 MHz | 1.5 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

In case of an intra-band contiguous CA bandwidth class C, MPR granted for the maximum output power is specified in the following Table 9 based on higher order modulation and contiguously aggregated transmission bandwidth configuration (resource blocks). When modulation formats are different from each other according to CCs different from each other, the MPR is determined by a rule applied to the higher order modulation.

Table 9 shows a general MPR in an intra-band contiguous CA for a user equipment of power class 3.

TABLE 9

| Modulation | CA bandwidth Class C | | | MPR [dB] |
|---|---|---|---|---|
| | 50 RB + 100 RB | 75 RB + 75 RB | 100 RB + 100 RB | |
| QPSK | >12 and ≤50 | >16 and ≤75 | >18 and ≤100 | ≤1 |
| QPSK | >50 | >75 | >100 | ≤2 |
| 16 QAM | ≤12 | ≤16 | ≤18 | ≤1 |
| 16 QAM | >12 and ≤50 | >16 and ≤75 | >18 and ≤100 | ≤2 |
| 16 QAM | >50 | >75 | >100 | ≤3 |

In case of the intra-band contiguous CA bandwidth class C, when a multi-cluster transmission is permitted, maximum output power is specified by an MPR Formula in the following.

$$MPR = CEIL\{MA, 0.5\} \qquad \text{[Formula 24]}$$

In Formula 24, MA is defined as follows.

MA=8.2; 0≤A≤0.025

MA=9.2-40 A; 0.025≤A<0.05

MA=8-16 A; 0.05≤A<0.25

MA=4.83-3.33 A; 0.25≤A≤0.4

3.83-0.83 A; 0.4≤A≤1

In this case, A corresponds to $N_{RB\_alloc}/N_{RB\_agg}$. And, CEIL means to round off in a manner of being nearest to 0.5 dB unit. For instance, it may be represented as MPR∈[3.0, 3.5, 4.0, 4.5, 5.0, 5.5, 6.0, 6.5, 7.0, 7.5].

In a closed-loop spatial multiplexing scheme, in case of a user equipment equipped with two antenna port connectors, the MPR granted for maximum output power is specified as shown in Table 8 in the above. In this case, the maximum output power is measure by the sum of the maximum output power outputted from each of the antenna connectors.

Besides the aforementioned MPR, additional requirement in the following can be applied to the maximum output power of the user equipment.

A network can signal such an additional requirement as an ACLR (adjacent channel leakage ratio) and an SEM (spectrum emission mask) to a user equipment according to a country and regional characteristic.

According to a current 3GPP LTE-A standard, when an eNode B signals an NS (network signaling) value according to a country and regional characteristic, A-MPR value corresponding to the NS value is defined. The A-MPR means an amount of power reduction for the maximum transmit power defined based on the regional characteristic. A protocol standard of a current LTE-A system defines an information element (IE) such as "AdditionalSpectrumEmission" and the IE is configured to enable 32 NSs to be included in the IE. As an example, Table 10 shows the A-MPR value according to a currently defined total NS and Table 11 to Table 14 shows A-MPR values according to environment in which a user equipment transmits data in each NS.

Table 10 shows an example of A-MPR (additional maximum power reduction).

TABLE 10

| Network Signalling value | Requirements (subclause) | E-UTRA Band | Channel bandwidth (MHz) | Resources Blocks ($N_{RB}$) | A-MPR [dB] |
|---|---|---|---|---|---|
| NS_01 | 6.6.2.1.1 | Table 5.5-1 | 1.4, 3, 5, 10, 15, 20 | Table 5.6-1 | NA |
| NS_03 | 6.6.2.2.1 | 2, 4, 10, 23, 25, 35, 36 | 3 | >5 | ≤1 |
| | | | 5 | >6 | ≤1 |
| | | | 10 | >6 | ≤1 |
| | | | 15 | >8 | ≤1 |
| | | | 20 | >10 | ≤1 |
| NS_04 | 6.6.2.2.2 | 41 | 5 | >6 | ≤1 |
| | | | 10, 15, 20 | Table 6.2.4-4 | |
| NS_05 | 6.6.3.3.1 | 1 | 10, 15, 20 | ≥50 | ≤1 |
| NS_06 | 6.6.2.2.3 | 12, 13, 14, 17 | 1.4, 3, 5, 10 | Table 5.6-1 | n/a |
| NS_07 | 6.6.2.2.3 6.6.3.3.2 | 13 | 10 | Table 6.2.4-2 | |
| NS_08 | 6.6.3.3.3 | 19 | 10, 15 | >44 | ≤3 |
| NS_09 | 6.6.3.3.4 | 21 | 10, 15 | >40 | ≤1 |
| | | | | >55 | ≤2 |
| NS_10 | | 20 | 15, 20 | Table 6.2.4-3 | |
| NS_11 | 6.6.2.2.1 | 23 | 1.4, 3, 5, 10, 15, 20 | Table 6.2.4-5 | |

TABLE 10-continued

| Network Signalling value | Requirements (subclause) | E-UTRA Band | Channel bandwidth (MHz) | Resources Blocks ($N_{RB}$) | A-MPR [dB] |
|---|---|---|---|---|---|
| NS_12 | 6.6.3.3.5 | 26 | 1.4, 3, 5 | Table 6.2.4-6 | |
| NS_13 | 6.6.3.3.6 | 26 | 5 | Table 6.2.4-7 | |
| NS_14 | 6.6.3.3.7 | 26 | 10, 15 | Table 6.2.4-8 | |
| NS_15 | 6.6.3.3.8 | 26 | 1.4, 3, 5, 10, 15 | Table 6.2.4-9 Table 6.2.4-10 | |
| NS_16 | 6.6.3.3.9 | 27 | 3, 5, 10 | Table 6.2.4-11, Table 6.2.4-12, Table 6.2.4-13 | |
| NS_17 | 6.6.3.3.10 | 28 | 5, 10 | Table 5.6-1 | n/a |
| NS_18 | 6.6.3.3.11 | 28 | 5 | ≥2 | ≤1 |
|  |  |  | 10, 15, 20 | ≥1 | ≤4 |
| NS_19 | 6.6.3.3.12 | 44 | 10, 15, 20 | Table 6.2.4-14 | |
| ... | | | | | |
| NS_32 | — | — | — | — | — |

Table 11 shows an example of A-MPR for NS_07.

TABLE 11

| Parameters | | Region A | | Region B | Region C |
|---|---|---|---|---|---|
| RB_start[1] | | 0-12 | | 13-18   19-42 | 43-49 |
| L_CRB[2] [RBs] | 6-8 | 1 to 5 and 9-50 | ≥8 | ≥18 | ≤2 |
| A-MPR [dB] | ≤8 | ≤12 | ≤12 | ≤6 | ≤3 |

Note
[1] RB_start indicates the lowest RB index of transmitted resource blocks
[2] L_CRB is the length of a contiguous resource block allocation
3 For intra-subframe frequency hopping between two regions, notes 1 and 2 apply on a per slot basis.
4 For intra-subframe frequency hopping between two regions, the larger A-MPR value of the two regions may be applied for both slots in the subframe.

Table 12 shows an example of A-MPR for NS_10.

TABLE 12

| Channel SW | Parameters | Region A |
|---|---|---|
| 15 | RB_start1 | 0-10 |
|  | L_CRB [RBs] | 1-20 |
|  | A-MPR [dB] | ≤2 |
| 20 | RB_start1 | 0-15 |
|  | L_CRB [RBs] | 1-20 |
|  | A-MPR [dB] | ≤5 |

Note
1 RB_start indicates the lowest RB index of transmitted resource blocks
2 L_CRB is the length of a contiguous resource block allocation
3 For intra-subframe frequency hopping which intersects Region A, notes 1 and 2 apply on a per slot basis.
4 For intra-subframe frequency hopping which intersect Region A, the larger A-MPR value may be applied for both slots in the subframe Table 13 shows an example of A-MPR for NS_04 in case that a bandwidth is greater than 5 MHz.

TABLE 13

| Channel BW | Parameters | Region A | Region B | Region C |
|---|---|---|---|---|
| 10 | RB_start[1] | 0-12 | 13-36 | 37-49 |
|  | RB_start[1] + L_CRB[2] [RBs] | n/a[3] | >37 | n/a[3] |
|  | A-MPR [dB] | ≤3dB | ≤2dB | ≤3dB |
| 15 | RB_start[1] | 0-18 | 19-55 | 56-74 |
|  | RB_start[1] + L_CRB[2] [RBs] | n/a[3] | >56 | n/a[3] |
|  | A-MPR [dB] | ≤3dB | ≤2dB | ≤3dB |
| 20 | RB_start[1] | 0-24 | 25-74 | 75-99 |
|  | RB_start[1] + L_CRB[2] [RBs] | n/a[3] | >75 | n/a[3] |
|  | A-MPR [dB] | ≤3dB | ≤2dB | ≤3dB |

Note
[1] RB_start indicates the lowest RB index of transmitted resource blocks
[2] L_CRB is the length of a contiguous resource block allocation
[3] Any RB allocation that starts in Region A or C is allowed the specified A-MPR
4 For intra-subframe frequency hopping which intersects regions, notes 1 and 2 apply on a per slot basis
5 For intra-subframe frequency hopping which intersects regions, the larger A-MPR value may be applied for both slots in the subframe Table 14 shows an example of A-MPR for NS_11.

TABLE 14

| Channel Bandwidth | | Parameters | | | | |
|---|---|---|---|---|---|---|
| 3 | Fc (MHz) | <2004 | | ≥2004 | | |
|  | $L_{CRB}$ (RBs) | 1-15 | | >5 | | |
|  | A-MPR | ≤5 | | ≤1 | | |
| 5 | Fc (MHz) | <2004 | | 2004 ≤ Fc < 2007 | | ≥2007 |
|  | $L_{CRB}$ (RBs) | 1-25 | | 1-6 & 15-25 | 8-12 | >6 |
|  | A-MPR | ≤7 | | ≤4 | 0 | ≤1 |
| 10 | Fc (MHz) | | | 2005 | | |
|  | $RB_{start}$ (RBs) | | | 0-49 | | |
|  | $L_{CRB}$ (RBs) | | | 1-50 | | |
|  | A-MPR | | | ≤12 | | |
| 15 | Fc (MHz) | | | [<2012.5] | | |
|  | $RB_{start}$ (RBs) | [0-4] | [5-21] | [0-6 & ≥50] | [22-56] | [57-74] |
|  | $L_{CRB}$ (RBs) | [≥1] | [7-50] | [0-6 & ≥50] | [≤25] | [>25] | [>0] |
|  | A-MPR | [≤15] | [≤7] | [≤10] | [0] | [≤6] | [≤15] |
|  | Fc (MHz) | | | [2012.5] | | |

TABLE 14-continued

| Channel Bandwidth | | Parameters | | | | | |
|---|---|---|---|---|---|---|---|
| | $RB_{start}$ (RBs) | [0-12] | [13-39] | | [40-65] | | [66-74] |
| | $L_{CRB}$ (RBs) | [≥1] | [≥30] | [<30] | [≥69-$RB_{start}$)] | | [≥1] |
| | A-MPR | [≤10] | [≤6] | [0] | [≤2] | | [≤6.5] |
| 20 | Fc (MHz) | | | 2010 | | | |
| | $RB_{start}$ (RBs) | [0-12] | [13-29] | | [30-68] | | [69-99] |
| | $L_{CRB}$ (RBs) | [≥1] | [10-60] | [1-9 & >60] | [1-24] | [≥25] | [≥1] |
| | A-MPR | [≤15] | [≤7] | [≤10] | [0] | [≤7] | [≤15] |

In a closed-loop spatial multiplexing scheme, in case of a user equipment equipped with two antenna port connectors, an A-MPR value specified in Table 10 can be applied to maximum output power. In this case, the maximum output power is measure by the sum of maximum output power outputted from each of the antenna connectors.

The configured maximum out power $P_{CMAX}$ of the user equipment is determined in consideration of P-Max and the like included in IE (information element) of SIB1 coming from the aforementioned MPR, the A-MPR and a network. The $P_{CMAX}$ is configured in a range shown in Formula 25 in the following.

$$P_{CMAX\_L} \leq P_{CMAX} \leq P_{CMAX\_H} \qquad \text{[Formula 25]}$$

In Formula 25, each of $P_{CMAX\_L}$ and $P_{CMAX\_H}$ is determined by Formula 26 in the following.

$$P_{CMAX\_L} = \text{MIN}\{P_{EMAX} - \Delta T_C, P_{PowerClass} - \text{MAX}(\text{MPR} + A\text{-MPR}, P\text{-MPR}) - \Delta T_C\}$$

$$P_{CMAX\_H} = \text{MIN}\{P_{EMAX}, P_{PowerClass}\} \qquad \text{[Formula 26]}$$

In Formula 26, $P_{EMAX}$ is a value signaled by an eNode B. For instance, the $P_{EMAX}$ can be given by IE P-Max. $P_{PowerClass}$ indicates maximum transmit power of a user equipment which is given according to a UE class. MPR and A-MPR can be configured according to what is mentioned earlier.

P-MPR means a granted maximum output power reduction. In case of simultaneously transmitting via not only a 3GPP RAN (radio access network) but also a RAT (radio access technology) or in case of requesting a less maximum output power, the P-MPR is used to satisfy the aforementioned requirement. The P-MPR can be informed to an eNode B by a user equipment in a $P_{CMAX}$ equation while the user equipment is reporting available maximum transmit power to the eNode B and can be used for determining scheduling of the eNode B.

$\Delta T_C$ is a value which is given according to a position of a bandwidth in a band. For instance, the $\Delta T_C$ can be given by 0 dB or maximum 1.5 dB.

$P_{UMAX}$ corresponding to a measured value for a configured maximum output power value indicates the configured maximum output power value in case that power reduction is performed in consideration of a modulation type, a network signaling value, a position in a band and the like. If IE P-max is not signaled, the $P_{UMAX}$ is identical to the $P_{CMAX}$. The $P_{UMAX}$ is configured in a range shown in Formula 27 in the following.

$$P_{CMAX\_L} - T(P_{CMAX\_L}) \leq P_{UMAX} \leq P_{CMAX\_H} + T(P_{CMAX\_H}) \qquad \text{[Formula 27]}$$

In Formula 27, $T(P_{CMAX})$ indicates a $P_{CMX}$ tolerance value and is applied to $P_{CMAX\_L}$ and $P_{CMAX\_H}$, respectively.

Table 15 shows an example of the $T(P_{CMAX})$.

TABLE 15

| $P_{CMAX}$ (dBm) | Tolerance $T(P_{CMAX})$ (dB) |
|---|---|
| 21 ≤ $P_{CMAX}$ ≤ 23 | 2.0 |
| 20 ≤ $P_{CMAX}$ < 21 | 2.5 |
| 19 ≤ $P_{CMAX}$ < 20 | 3.5 |
| 18 ≤ $P_{CMAX}$ < 19 | 4.0 |
| 13 ≤ $P_{CMAX}$ < 18 | 5.0 |
| 8 ≤ $P_{CMAX}$ < 13 | 6.0 |
| −40 ≤ $P_{CMAX}$ < 8 | 7.0 |

And, in case of performing carrier aggregation, a user equipment can configure maximum output power $P_{CMAX,c}$ configured according to a serving cell (c). In this case, total configured maximum output power is identical to the aforementioned $P_{CMAX}$. The maximum output power configured by the user equipment according to the serving cell (c) is configured in a range shown in Formula 28 in the following.

$$P_{CMAX\_L,c} \leq P_{CMAX,c} \leq P_{CMAX\_H,c} \qquad \text{[Formula 28]}$$

In Formula 28, $P_{CMAX\_H,c}$ if is determined as shown in Formula 29 in the following. In case of intra-band contiguous CA, $P_{CMAX\_L,c}$ is determined as shown in Formula 30 in the following. In case of inter-band non-contiguous CA, $P_{CMAX\_L,c}$ is determined as shown in Formula 31 in the following.

$$P_{CMAX\_H,c} = \text{MIN}\{P_{EMAX,c}, P_{PowerClass}\} \qquad \text{[Formula 29]}$$

$$P_{CMAX\_L,c} = \text{MIN}\{P_{EMAX,c} - \Delta T_{C,c}, P_{PowerClass} - \text{MAX}(\text{MPR}_c + A\text{-MPR}_c, P\text{-MPR}_c) - \Delta T_{C,c}\} \qquad \text{[Formula 30]}$$

$$P_{CMAX\_L,c} = \text{MIN}\{P_{EMAX,c} - \Delta T_{C,c}, P_{PowerClass} - \text{MAX}(\text{MPR}_c + A\text{-MPR}_c + \Delta T_{IB,c}, P\text{-MPR}_c) - \Delta T_{C,c}\} \qquad \text{[Formula 31]}$$

$P_{EMAX,c}$ is a value signaled by an eNode B. For instance, the value can be given by IE P-max. $P_{PowerClass}$ corresponds to maximum transmit power of a user equipment which is given according to a UE class. $\Delta T_{IB,c}$ indicates an additional tolerance value for a serving cell (c).

In case of inter-band CA, $MPR_c$ (refer to Table 8) and $A\text{-MPR}_c$ (refer to Table 10 to Table 14) are applied according to the serving cell (c). On the contrary, in case of intra-band contiguous CA, it may represented as '$MPR_c = MPR$' (refer to Table 9) and '$A\text{-MPR}_c = A\text{-MPR}$'.

$P\text{-MPR}_c$ is used for managing power of the serving cell (c). In case of intra-band CA, there exists one power management (P-MPR) for a UE. In this case, it may be represented as '$P\text{-MPR}_c = P\text{-MPR}$'.

$T_{C,c}$ is a value which is given according to a position of a transmission band in a band. For instance, the value can be given by 0 dB or maximum 1.5 dB.

In case of inter-band CA having one UL serving cell, total maximum output power $P_{CMAX}$ is configured within a range shown in Formula 32 in the following.

$$P_{CMAX\_L} \leq P_{CMAX} \leq P_{CMAX\_H} \qquad \text{[Formula 32]}$$

In Formula 32, it corresponds as follows. $P_{CMAX\_L} = P_{CMAX\_L,c}$ and $P_{CMAX\_H} = P_{CMAX\_H,c}$.

In case of intra-band CA, Pcmax,c is calculated under an assumption that transmit power is identically increased in all CCs. On the contrary, in case of inter-band CA, Pcmax,c is calculated under an assumption that transmit power is independently increased in all CCs.

A measured maximum output power value $P_{UMAX}$ is configured within a range shown in Formula 33 in the following.

$$P_{CMAX\_L} - T(P_{CMAX\_L}) \le P_{UMAX} \le P_{CMAX\_H} + T(P_{CMAX\_H}) \quad \text{[Formula 33]}$$

$T(P_{CMAX})$ is applied to $P_{CMAX\_L}$ and $P_{CMAX\_H}$, respectively.

Table 16 shows examples of the $T(P_{CMAX})$

TABLE 16

| $P_{CMAX}$ (dBm) | Tolerance $T(P_{CMAX})$ (dB) |
| --- | --- |
| 21 ≤ $P_{CMAX}$ ≤ 23 | 2.0 |
| 20 ≤ $P_{CMAX}$ < 21 | [2.5] |
| 19 ≤ $P_{CMAX}$ < 20 | [3.5] |
| 18 ≤ $P_{CMAX}$ < 19 | [4.0] |
| 13 ≤ $P_{CMAX}$ < 18 | [5.0] |
| 8 ≤ $P_{CMAX}$ < 13 | [6.0] |
| −40 ≤ $P_{CMAX}$ < 8 | [7.0] |

In case of carrier aggregation having two UL serving cells, total maximum output power for all cells is configured within a range shown in Formula 34 in the following.

$$P_{CMAX\_L\_CA} \le P_{CMAX} \le P_{CMAX\_H\_CA} \quad \text{[Formula 34]}$$

In Formula 34, in case of intra-band contiguous CA, $P_{CMAX\_L\_CA}$ and $P_{CMAX\_H\_CA}$ are respectively determined as Formula 35 shown in the following.

$$P_{CMAX\_L\_CA} = \text{MIN}\{10 \log_{10} \Sigma p_{EMAX,c} - \Delta T_C, P_{PowerClass} - \text{MAX}(MPR + A\text{-}MPR, P\text{-}MPR) - \Delta T_C\}$$
$$P_{CMAX\_H\_CA} = \text{MIN}\{10 \log_{10} \Sigma p_{EMAX,c}, P_{PowerClass}\} \quad \text{[Formula 35]}$$

In Formula 35, $P_{EMAX,c}$ indicates a linear value of the $P_{EMAX,c}$. The value can be given by a value signaled by an eNode B (e.g., IR P-max). $P_{PowerClass}$ corresponds to maximum transmit power of a user equipment which is given according to a UE class. MPR and A-MPR can be configured according to what is mentioned earlier. $\Delta T_C$ indicates a largest value among $\Delta T_{C,c}$ for all serving cells (c).

On the contrary, in case of inter-band CA, in relation to a serving cell (c), $P_{CMAX\_L\_CA}$ and $P_{CMAX\_H\_CA}$ in Formula 34 are respectively determined as Formula 36 shown in the following according to an operating band.

$$P_{CMAX\_L\_CA} = \text{MIN}\{10 \log_{10} \Sigma \text{MIN}[p_{EMAX,c}/(\Delta t_{C,c}), p_{PowerClass}/(mpr_c \cdot a\text{-}mpr_c \cdot \Delta t_{C,c} \cdot \Delta t_{IB,c}), p_{PowerClass}/(pmpr_c \cdot \Delta t_{C,c})], P_{PowerClass}\}$$

$$P_{CMAX\_H\_CA} \text{MIN}\{10 \log_{10} \Sigma p_{EMAX,c}, P_{PowerClass}\} \quad \text{[Formula 36]}$$

In Formula 36, $P_{EMAX,c}$ indicates a linear value of the $P_{EMAX,c}$. The value can be given by a value signaled by an eNode B (e.g., IR P-max). $P_{PowerClass}$ corresponds to maximum transmit power of a user equipment which is given according to a UE class. $MPR_c$ and $A\text{-}MPR_c$ are respectively applied to the serving cell (c) and can be configured according to what is mentioned earlier. $mpr_c$ indicates a linear value of $MPR_c$ and $a\text{-}mpr_c$ indicates a linear value of $A\text{-}MPR_c$. $pmpr_c$ indicates a linear value of $P\text{-}MPR_c$.

For instance, $\Delta t_{C,c}$ can be given by 1.41 dB or 1 dB. $\Delta t_{IB,c}$ indicates a linear value of $\Delta T_{IB,c}$ for a serving cell (c). if an inter-band relaxation term is permitted, $\Delta t_{IB,c}$ corresponds to 1.

A maximum output power value $P_{UMAX}$, which is measured for all serving cells, is shown in Formula 37 in the following and can be configured in a range of Formula 38 in the following.

$$P_{UMAX} = 10 \log_{10} \Sigma p_{UMAX,c} \quad \text{[Formula 37]}$$

$$P_{CMAX\_L\_CA} - T(P_{CMAX\_L\_CA}) \le P_{UMAX} \le P_{CMAX\_H\_CA} + T(P_{CMAX\_H\_CA}) \quad \text{[Formula 38]}$$

In Formula 37, $P_{UMAX}$ indicates maximum output power measured for a serving cell (c) which is represented by a linear scale.

$T(P_{CMAX})$ is applied to $P_{CMAX\_L\_CA}$ and $P_{CMAX\_H\_CA}$, respectively.

Table 17 shoes examples of the $T(P_{CMAX})$

TABLE 17

| $P_{CMAX}$ (dBm) | Tolerance $T(P_{CMAX})$ Intra-band with two active UL serving cells [dB] | Tolerance $T(P_{CMAX})$ Inter-band with two active UL serving cells [dB] |
| --- | --- | --- |
| 21 ≤ $P_{CMAX}$ ≤ 23 | 2.0 | 2.0 |
| 20 ≤ $P_{CMAX}$ < 21 | [2.5] | TBD |
| 19 ≤ $P_{CMAX}$ < 20 | [3.5] | TBD |
| 18 ≤ $P_{CMAX}$ < 19 | [4.0] | TBD |
| 13 ≤ $P_{CMAX}$ < 18 | [5.0] | TBD |
| 8 ≤ $P_{CMAX}$ < 13 | [6.0] | TBD |
| −40 ≤ $P_{CMAX}$ < 8 | [7.0] | TBD |

In case of a user equipment supporting inter-band CA, $\Delta T_{IB,c}$ is defined for an applicable band as shown in Table 18 in the following.

Table 18 shows examples of $\Delta T_{IB,c}$.

TABLE 18

| Inter-band CA Configuration | E-UTRA Band | $\Delta T_{IB,c}$ [dB] |
| --- | --- | --- |
| CA_1A-5A | 1 | 0.3 |
|  | 5 | 0.3 |

In case of a user equipment equipped with multiple transmission antenna connectors to support UL-MIMO, transmit power is configured according to each UE. $P_{CMAX\_L}$ and $P_{CMAX\_H}$ for configured maximum output power $P_{CMAX}$ can be determined according to what is mentioned earlier.

Measured maximum output power value $P_{UMAX}$ is configured within a range shown in Formula 39.

$$P_{CMAX\_L} - T_{LOW}(P_{CMAX\_L}) \le P_{UMAX} \le P_{CMAX\_H} + T_{HIGH}(P_{CMAX\_H}) \quad \text{[Formula 39]}$$

In Formula 39, $T_{LOW}(P_{CMAX\_L})$ and $T_{HIGH}(P_{CMAX\_H})$ indicate a tolerance value and are applied to $P_{CMAX\_L}$ and $P_{CMAX\_H}$, respectively.

Table 19 shows examples of T ($P_{CMAX}$) in a closed-loop spatial multiplexing scheme supporting UL-MIMO.

TABLE 19

| $P_{CMAX}$ (dBm) | Tolerance $T_{LOW}(P_{CMAX\_L})$ (dB) | Tolerance $T_{HIGH}(P_{CMAX\_H})$ (dB) |
| --- | --- | --- |
| $P_{CMAX}$ = 23 | 3.0 | 2.0 |
| [22] ≤ $P_{CMAX}$ < [23] | [5.0] | [2.0] |
| [21] ≤ $P_{CMAX}$ < [22] | [5.0] | [3.0] |
| [20] ≤ $P_{CMAX}$ < [21] | [6.0] | [4.0] |
| [16] ≤ $P_{CMAX}$ < [20] | [5.0] |  |
| [11] ≤ $P_{CMAX}$ < [16] | [6.0] |  |
| [−40] ≤ $P_{CMAX}$ < [11] | [7.0] |  |

ON/OFF Time Mask

Typically, it is necessary for transmitters to have prescribed time to turn on output power and turn off the output power. This means that turning on the output power and turning off the output power do not immediately occur. Moreover, very rapid switching between on-state and off-state may generate undesirable signal emissions on contiguous carriers generating adjacent channel interference and the undesirable signal emissions should be limited to a specific level. Hence, there exists a transient period in which off-state of a transmitter is switched to on-state and vice-versa. And, in case of UL, power allocation per subframe is differently configured according to such a physical layer channel as PUSCH, PUCCH and SRS. In case that power difference occurs between contiguous channels, there exists the transient period as well.

Figure 12:
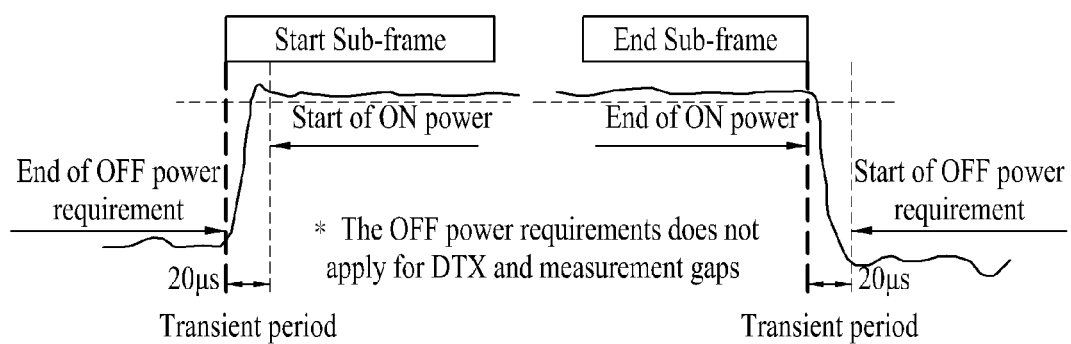
FIG. 12 is a diagram for an example of a general ON/OFF time mask.

FIG. 12 is a diagram for an example of a general ON/OFF time mask.

Referring to FIG. 12, a general ON/OFF time mask is defined by a period examined when an output power from OFF power to ON power is turned on and a period examined when an output power from ON power to OFF power is turned off. The ON/OFF time mask may occur on DTX (discontinued transmission) interval, a measurement gap, start or end of contiguous/non-contiguous transmission.

An OFF power measurement period is defined by at least one subframe section except a transient period. And, ON power is defined by average power for one subframe except the transient period. In this case, the OFF power section and the ON power section should satisfy a requirement of the OFF power and a requirement of the ON power, respectively. Yet, requirement for UL transmit power is not defined in the transient period.

Figure 13:
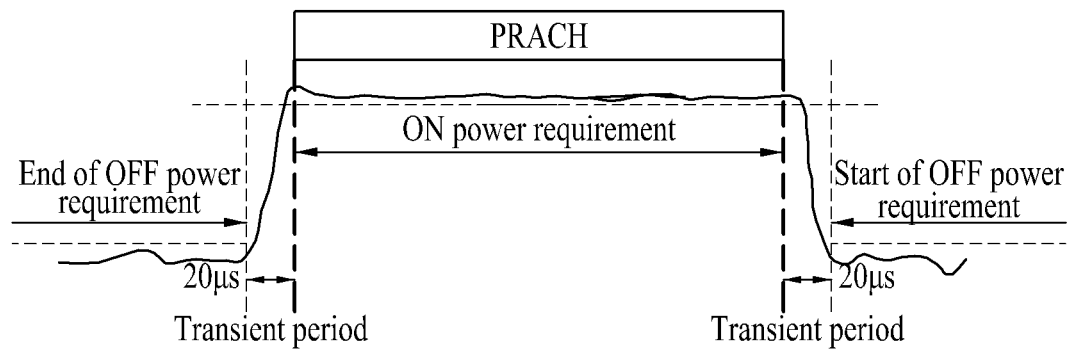
FIG. 13 is a diagram for an example of a PRACH (physical random access channel) ON/OFF time mask.

FIG. 13 is a diagram for an example of a PRACH (physical random access channel) ON/OFF time mask.

Referring to FIG. 13, a transient period of 20 μs is configured between a PRACH ON power section and a PRACH OFF power section. PRACH ON power is defined by average power during PRACH ON power measurement period except transient period and should satisfy a PRACH ON power requirement. The PRACH ON power measurement period may vary according to PRACH preamble formats different from each other as shown in Table 20 in the following.

Table 20 shows examples of PRACH ON power measurement period.

TABLE 20

| PRACH preamble format | Measurement period (ms) |
| --- | --- |
| 0 | 0.9031 |
| 1 | 1.4844 |
| 2 | 1.8031 |
| 3 | 2.2844 |
| 4 | 0.1479 |

Figure 14:
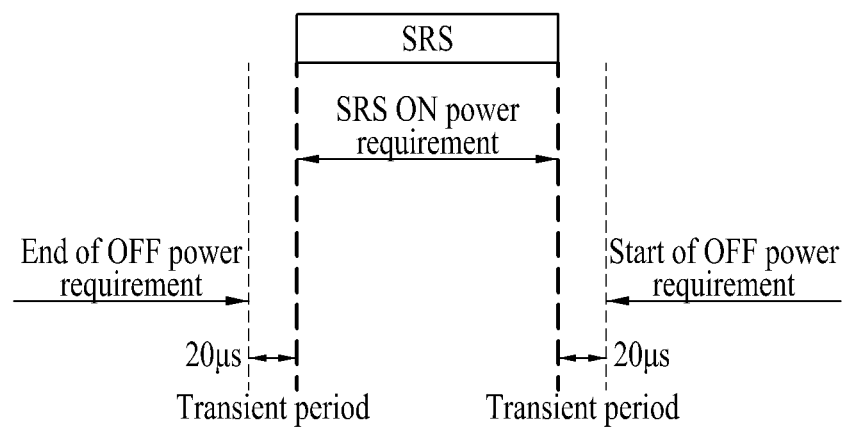
FIG. 14 is a diagram for an example of a single SRS time mask.
Figure 15:
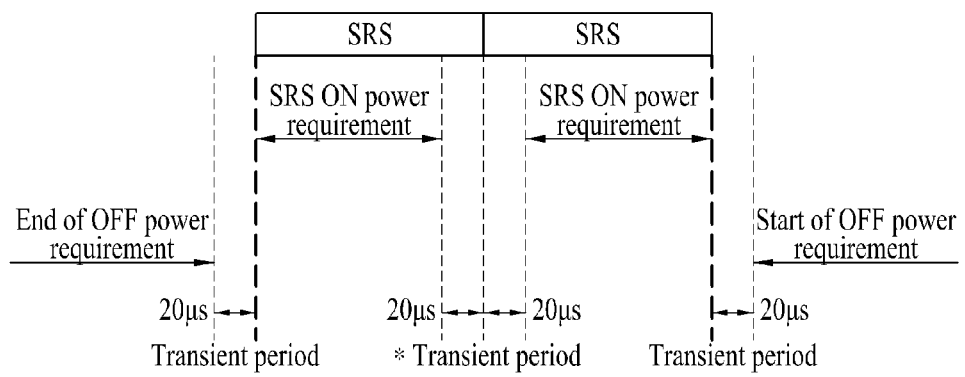
FIG. 15 is a diagram for an example of a dual SRS time mask.

FIG. 14 is a diagram for an example of a single SRS time mask and FIG. 15 is a diagram for an example of a dual SRS time mask.

Referring to FIG. 14, a transient period of 20 μs is configured between an SRS symbol (SRS ON power section) and an OFF power section. In case of a single SRS transmission, SRS ON power is defined by average power in a symbol period for SRS transmission except the transient period and should satisfy an SRS ON power requirement.

On the contrary, referring to FIG. 15, in case of dual SRS transmission (e.g., in case of UpPTS transmission), a transient period of 20 μs is configured between dual SRS symbol and OFF power section. In this case, the transient period configured between the dual SRS symbols can be applied only when frequency hopping is applied between the dual SRS symbols or transmit power is changed. In case of the dual SRS transmission, SRS ON power is defined by average power in each symbol period for SRS transmission except the transient period and should satisfy an SRS ON power requirement.

Figure 16:
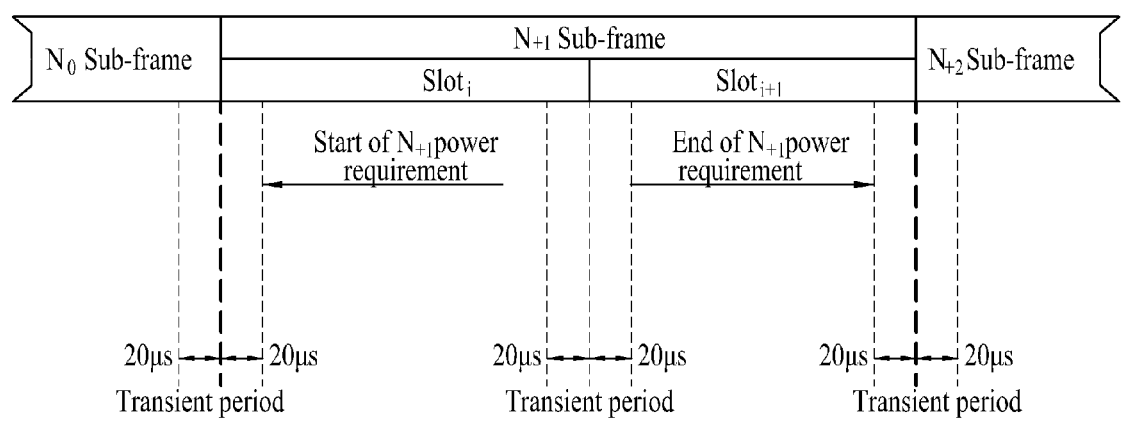
FIG. 16 is a diagram for an example of a time mask on a slot/subframe boundary.

FIG. 16 is a diagram for an example of a time mask on a slot/subframe boundary.

Referring to FIG. 16, a subframe boundary time mask is defined by a period examined between a previous or next subframe and a (reference) subframe. In an example of FIG. 16, a transient period of 40 μs (20 μs+20 μs) is configured between an $N_0$ subframe and an $N_{+1}$ subframe and between the $N_{+1}$ and an $N_{+2}$ subframe, respectively. In this case, a transient period on a slot boundary in a subframe is configured in case of intra-subframe frequency hopping only. The transient period is configured on both sides of the slot boundary.

Yet, if a subframe includes an SRS time mask, the transient period can be differently defined. Regarding this, it shall be described with reference to FIGS. 17 to 20 in the following.

FIGS. 17 to 20 are diagram for examples of PUCCH/PUSCH/SRS time mask.

Figure 17:
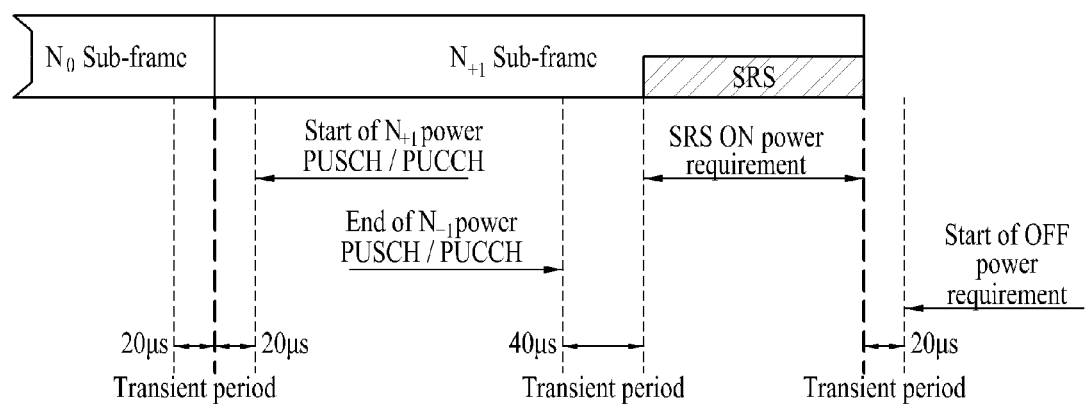
FIGS. 17 to 20 are diagram for examples of PUCCH/PUSCH/SRS time mask.

FIG. 17 shows an example of PUCCH/PUSCH/SRS time mask in case that there exist transmission before an SRS symbol and there is no transmission after the SRS symbol. In this case, a transient period of 40 μs (20 μs+20 μs) is configured between PUSCH/PUCCH symbols and an SRS transmission symbol. Yet, since there is no UL transmission in a next subframe of an $N_{+1}$ subframe, a transient period of 20 μs is configured from a start point of the next subframe.

Figure 18:
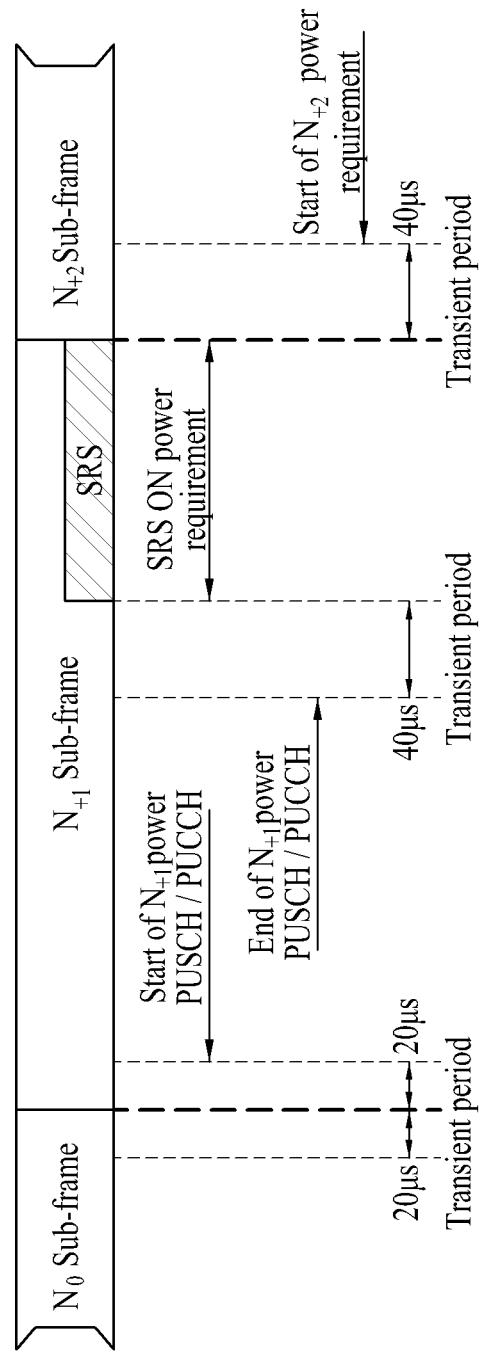

FIG. 18 shows an example of PUCCH/PUSCH/SRS time mask in case that there exists transmission before an SRS symbol and after the SRS symbol. In this case, a transient period of 40 μs (20 μs+20 μs) is configured between PUSCH/PUCCH symbols and an SRS transmission symbol. Since there exists UL transmission in a next subframe ($N_{+2}$ subframe) of an SRS symbol, the transient period is configured for 40 μs after the SRS symbol.

Figure 19:
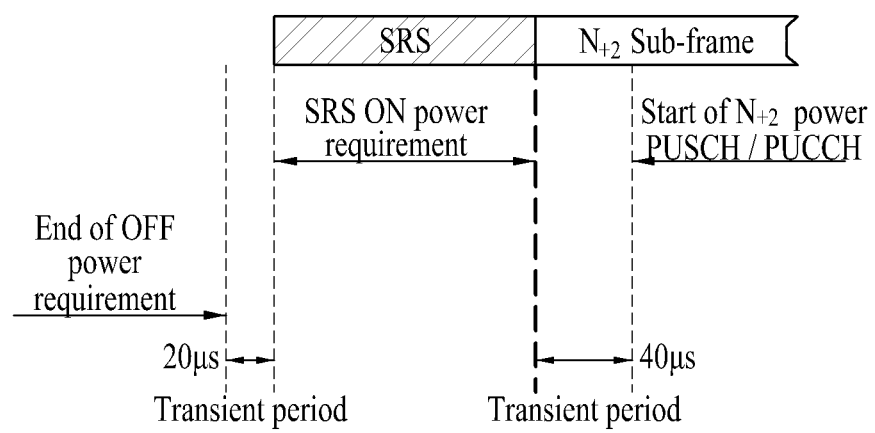

FIG. 19 shows an example of PUCCH/PUSCH/SRS time mask in case that there exists transmission after an SRS symbol and there is no transmission before the SRS symbol. In this case, a transient period of 20 μs is configured between the SRS symbol and OFF power section. Since there exists UL transmission in a next subframe ($N_{+2}$ subframe) of the SRS symbol, a transient period is configured for 40 μs after the SRS symbol.

Figure 20:
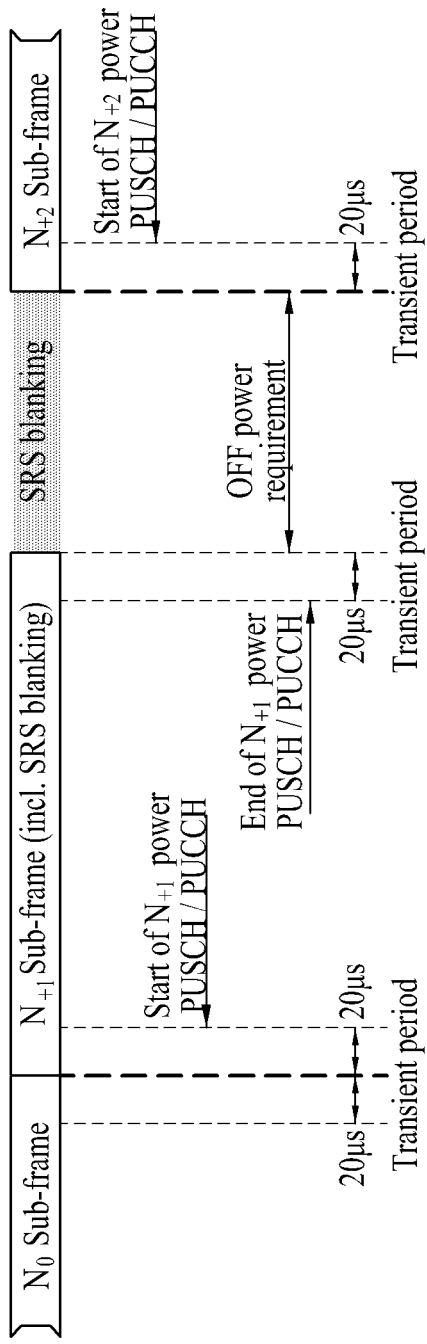

FIG. 20 shows an example of an SRS time mask in case that there exists SRS blanking in a FDD system. If the SRS blanking exists, although UL transmission exists before the SRS blanking and after the SRS blanking, a transient period of 20 μs is configured before the SRS blanking and after the SRS blanking, respectively.

As mentioned in the foregoing description, the PUCCH/PUSCH/SRS time mask is defined as a period examined between the SRS symbol and a PUSCH/PUCCH symbol adjacent to the SRS symbol or between the SRS symbol and a subframe adjacent to the SRS symbol.

In case of intra-band contiguous CA, the aforementioned general output power ON/OFF time mask can be applied to each component carrier during an ON power period and a transient period. The aforementioned OFF period can be applied to each component carrier only when all component carriers are OFF.

Enhanced Power Control Method

According to a current 3GPP LTE-A Rel-10 system, in case that a user equipment aggregates a plurality of component carriers, UL can be transmitted in a manner that a timing advance (TA) value, which is applicable to a single component carrier (e.g., a primary cell (PCell) or a primary component carrier (PCC)), is 'commonly' applied to a plurality of the component carriers.

Yet, the user equipment can aggregate a plurality of component carriers, of which belong to bands different from each other, of which are separated from each other on a frequency, i.e., of which propagation properties are different from each other. And, as shown in FIG. 21 in the following, it may consider a case that a specific part of a plurality of the component carriers is connected with a remote radio header (RRH), i.e., a repeater, existing in a cell to extend a coverage or eliminate a coverage hole.

Figure 21:
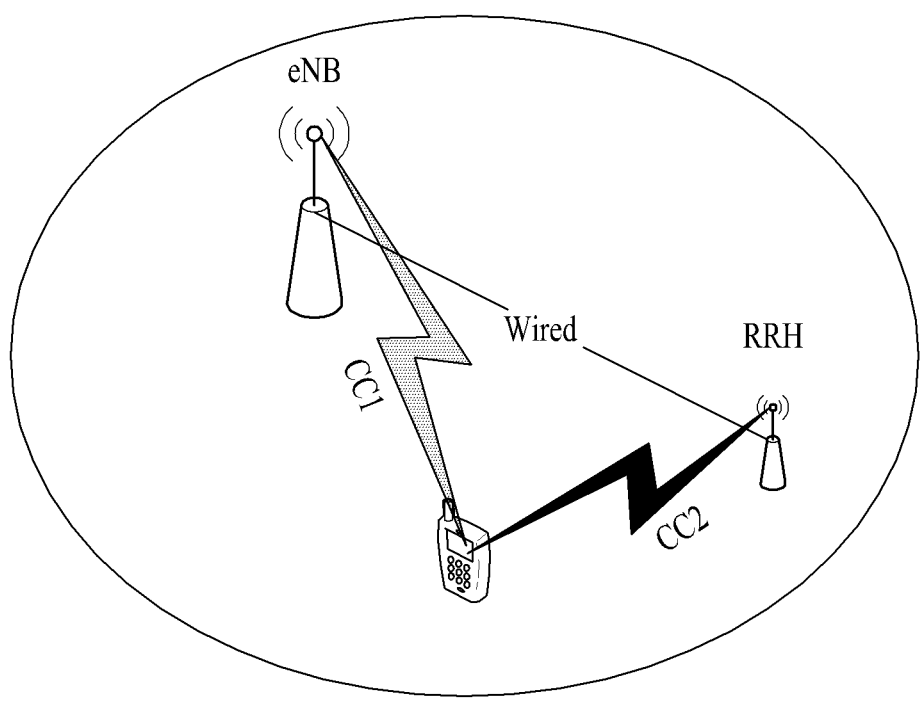
FIG. 21 is a diagram for an example of a situation that uplink propagations different from each other occur between aggregated component carriers.

FIG. 21 is a diagram for an example of a situation that uplink propagations different from each other occur between aggregated component carriers.

As an example of the aforementioned contents, FIG. 21 shows an example of a situation that a user equipment aggregates two component carriers, one of the two components is communicating with an RRH in a manner of being connected with the RRH due to such a reason as a limited coverage and the like and another component carrier is directly communicating with an eNode B without the RRH. In this case, propagation delay of a UL signal transmitted on a component carrier 1 (i.e., direct communication between the eNode B and the user equipment via a radio channel) and propagation delay of a UL signal transmitted on a component carrier 2 (i.e., in case of transmitting the UL signal via the RRH) may be different from each other due to such a reason as a center frequency difference, a physical distance of transmitting/receiving end, processing time of the RRH and the like.

In this case, in case of performing UL transmission with a scheme of commonly applying a conventionally used single TA value to a plurality of component carriers, it may considerably affect synchronization of UL signals transmitted from a plurality of the component carriers. Hence, if a plurality of the component carriers have properties of propagation delay different from each other, it should have a plurality of (multiple) TAs in order to independently apply a TA to each component carrier.

FIG. 22 is a diagram for an example of applying multiple TA according to each component carrier.

Referring to FIG. 22, in a situation that a user equipment aggregates two component carriers (PCell and SCell), the user equipment can transmit an UL signal (PUSCH) in a manner of applying TAs (i.e., TA 1≠TA 2) different from each other in accordance with each component carrier. Although FIG. 22 shows an example that the user equipment transmits the UL signal in the SCell prior to the PCell (i.e., TA 2>TA 1), the user equipment can preferentially transmit the UL signal in the PCell prior to the SCell.

In the following, the present invention proposes a method of controlling UL transmit power of a user equipment in a transient period in a manner of redefining the transient period, which generally occurs when power control is performed between UL channels for cells (or cell groups) operating with independent UL TA. And, the present invention proposes a securing method for an eNode B to smoothly receive channel information or data, which is necessary to be protected in the transient period, in a manner of determining priority between channels in the transient period.

For clarity, a scheme of applying independent TA to cells different from each other is explained in the following. Yet, the scheme can be identically applied to a scheme of applying an independent TA to each of cell groups consisting of one or a plurality of cells. In particular, a cell to which TA is applied described in the present invention may indicate a cell group to which an independent TA is applied. And, a PCell (or a PCell group) may correspond to a cell group to which an identical TA is applied in a manner of being grouped by a single PCell or a single PCell and one or more SCells. And, a SCell (or SCell group) may correspond to a cell group to which an identical TA is applied in a manner of being grouped by a single SCell or a plurality of the SCells. And, a group of cells to which an identical TA is applied is called a TA group (TAG) in the present invention. A TAG to which the PCell belongs thereto is called a PCell TAG and a TAG to which the PCell does not belong is called a SCell TAG One TAG may include one or more cells.

When a user equipment aggregates a plurality of carriers and uses a plurality of the carriers to transmit UL signal/data, the carriers aggregated by the user equipment may exist on frequency bands different from each other defined in a manner of being relatively apart from each other on a frequency axis or an identical frequency band. And, in case of aggregating a plurality of carriers on an identical frequency band, the user equipment can contiguously aggregate directly adjacent carriers or non-contiguously aggregate carriers not adjacent to each other. In this case, aggregation of the carriers belonging to frequency bands different from each other is called inter-band carrier aggregation. Aggregation of the contiguous carriers belonging to an identical frequency band is called intra-band contiguous carrier aggregation. Aggregation of non-contiguous carriers belonging to an identical frequency band is called intra-band non-contiguous carrier aggregation.

As mentioned in the foregoing description, the total of maximum power of a user equipment, which has aggregated a plurality of carriers, capable of transmitting in a subframe for all carriers is determined by a $P_{CMAX}$ value as shown in Formula 40 in the following in accordance with a transmission situation in each subframe.

$$P_{CMAX\_L\_CA} \leq P_{CMAX} \leq P_{CMAX\_H\_CA} \quad \text{[Formula 40]}$$

In this case, $P_{CMAX\_L\_CA}$, which is the lowest limit of the $P_{CMAX}$, is determined by being calculated with an MPR function as shown in Formula 41 in the following in case of intra-band (or intra-band contiguous) carrier aggregation.

$$P_{CMAX\_L\_CA} = \text{MIN}\{10 \log_{10} \Sigma p_{EMAX,c} - \Delta T_C$$
$$P_{PowerClass} - \text{MAX}(\text{MPR}+A\text{-MPR},P\text{-MPR}) - \Delta T_C\} \quad \text{[Formula 41]}$$

In Formula 41, as mentioned in the foregoing description, an MPR value is determined in consideration of a ratio of the maximum number of resource block (RB) capable of being transmitted by a user equipment via a plurality of the aggregated carriers in a corresponding subframe to the number of resource blocks transmitted via actual UL multiple carriers, a transmission aspect (e.g., modulation order and the like) for a plurality of the aggregated carriers and the like.

On the contrary, in case of inter-band (or intra-band non-contiguous) carrier aggregation, $P_{CMAX\_L\_CA}$ is determined in a manner of being calculated with an MPR function calculated on each carrier as shown in Formula 42 in the following.

$$P_{CMAX\_L\_CA} = \text{MIN}\{10 \log_{10} \Sigma \text{MIN}[p_{EMAX,c}/(\Delta t_{C,c}),$$
$$p_{PowerClass}/(mpr_c \cdot a\text{-}mpr_c \cdot \Delta t_{C,c} \cdot t_{IB,c}) \cdot p_{PowerClass}/$$
$$(pmpr_c \cdot \Delta t_{C,c})],P_{PowerClass}\} \quad \text{[Formula 42]}$$

Hence, if it is assumed that a user equipment uses RF chains different from each other according to two cells (or component carriers) in the present invention, when the user equipment supporting inter-band carrier aggregation transmits information of the user equipment in a manner of estimating independent TA according to each cell, the two cells may have an over-crossed region according to the TA. Regarding this, it shall be explained with reference to FIG. 23 in the following.

Figure 23:
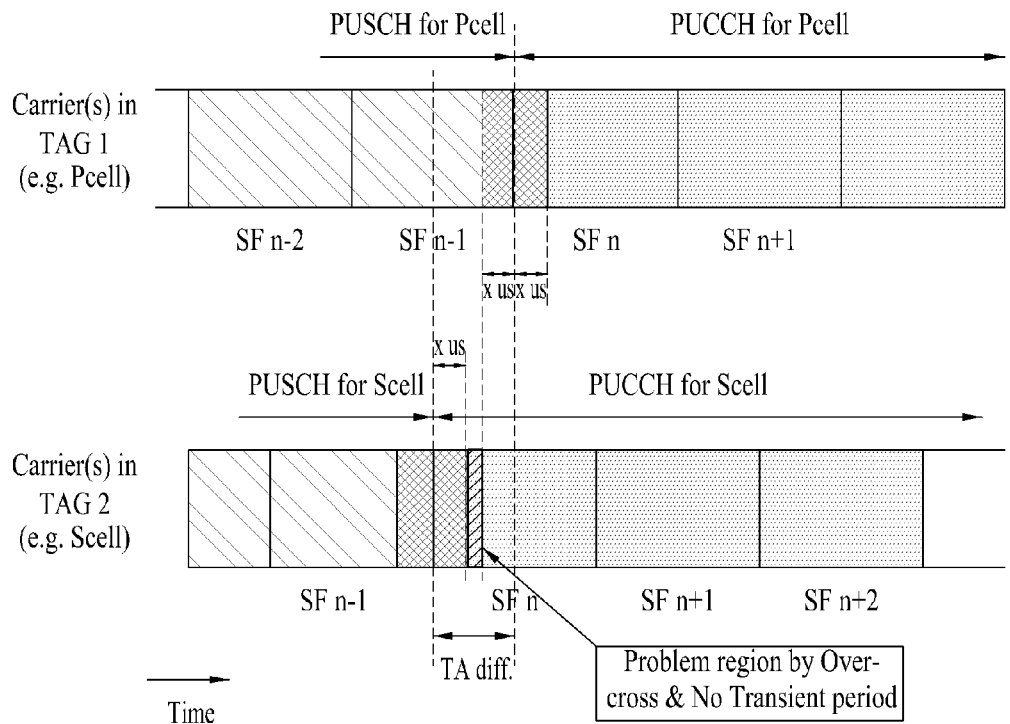
FIGS. 23 to 30 are diagrams for examples of a transmission frame structure of a user equipment supporting carrier aggregation in multi-TA environment.

FIG. 23 is a diagram for an example of a transmission frame structure of a user equipment supporting carrier aggregation in multi-TA environment.

Referring to FIG. 23, a user equipment transmits contiguous PUSCH until an n−1 subframe (SF) and transmits contiguous PUCCH from an n subframe in a cell (e.g., PCell) belonging to a TAG 1. FIG. 23 shows a case that a transient period is configured since power difference has occurred compared to a previous PUSCH. And, the user equipment transmits contiguous PUSCH until the n−1 subframe and transmits contiguous PUCCH from the n subframe in a cell belonging to a TAG 2. FIG. 23 shows a case that a transient period is configured since power difference has occurred compared to PUCCH and a previous PUSCH.

In this case, a region in which subframes different from each other (except a transient period) are over-crossed according to multiple TAs may occur. In particular, when the subframes different from each other are overlapped with each other in a manner of deviating from an identical subframe boundary of a plurality of cells, the over-crossed region in a plurality of cells indicates a region where maximum transmit power of a user equipment is over a power control requirement since the user equipment transmits data in both the two cells since the overlapped part is not included in a transient period. An example shown in FIG. 23 shows a case that an n−1 SF of the PCell and an n subframe of the SCell are overlapped with each other. In this case, a starting point transmitting PUCCH appearing after a transient period of the SCell ends is over-crossed with a section transmitting PUSCH prior to a transient period of the PCell, there may exist a case that transmit power does not satisfy a power control requirement defined in a legacy release-8/9/10 standard specification. In particular, as mentioned in the foregoing description, although user equipments, which have aggregated a plurality of cells, control UL transmit power according to each subframe, in case that subframes different from each other are overlapped with each other (a part that an n−1 subframe of the PCell and an n subframe of the SCell are overlapped with each other in an example in FIG. 23), it is not defined a subframe (the n−1 subframe of the PCell or the n subframe of the SCell in the example in FIG. 23) to which power control requirement should be applied. Hence, there exists a case that the power control requirement is not satisfied in a situation to which multiple TAs are applied. Hence, in case of independently using the multiple TAs, an object of the present invention is to reconfigure the over-crossed region between two cells as a transient period to protect the region in a manner of reconfiguring the transient period and defining priority according to each channel for the transient period. In particular, although a transient period defined as x μs in FIG. 23 is defined as 'x=20 μs' by a current 3GPP TS 36.101, this value may become larger due to maximum difference of multiple TAs according to the present invention.

As mentioned in the foregoing description, in case that a user equipment aggregates cells (or carriers) belonging to a plurality of TAG groups in multiple TA environment, transmission timing for each cell of the user equipment may vary. Regarding this, it shall be described with reference to FIG. 24 in the following.

Figure 24:
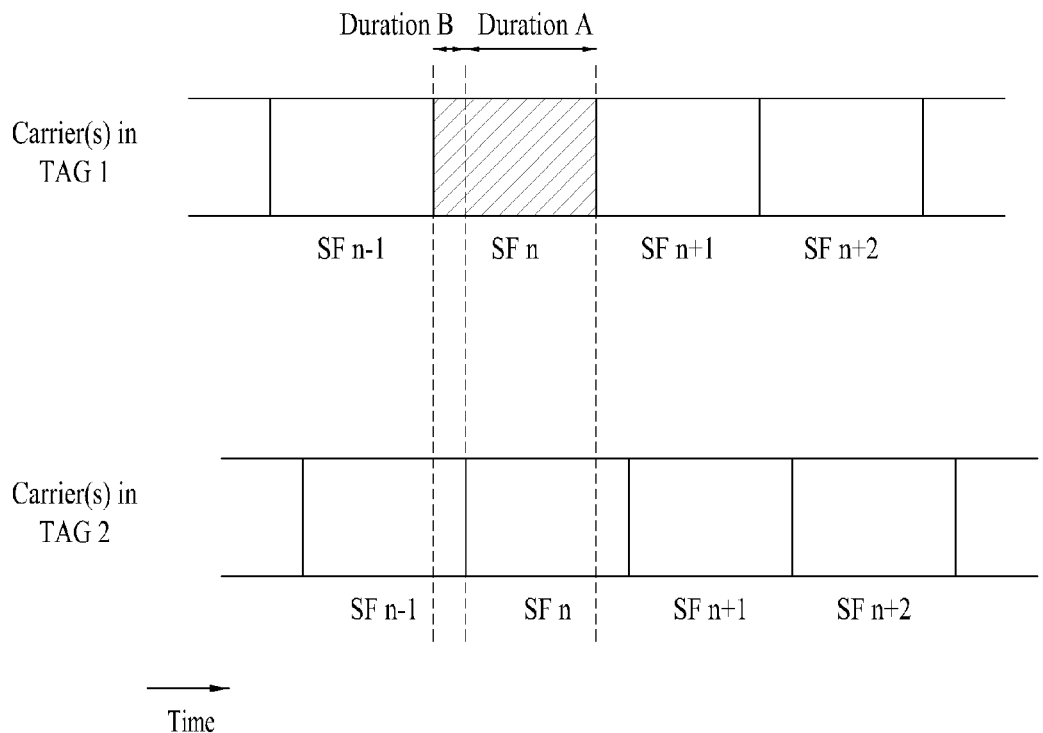

FIG. 24 is a diagram for an example of a transmission frame of a user equipment supporting carrier aggregation in multiple TA environment.

FIG. 24 shows an example of UL transmission timing when a user equipment is operating with two TAGs. Transmission start timing of an n subframe (SF) for a TAG 1 is faster than transmission timing of an n subframe for a TAG 2 as much as duration B. Hence, the subframe n of the TAG 1 is overlapped with an n−1 subframe of the TAG 2. A generally used TA value is identical to each other according to each cell. Yet, a TA value for PRACH may be different from the generally used TA value. In this case, TA difference can be defined as Formula 43 and Formula 44 in the following.

$$TA\_diff = |Propagation\ delay Cell1 - Propagation\ delay Cell2|$$ [Formula 43]

$$TA\_diff\_{RACH} = |T\_{Propagation\ delay Cell1} - T\_{Propagation\ delay Cell2}| + \Delta T\_{RACH}$$ [Formula 44]

Embodiment 1

When multiple TAs are applied in inter-band CA environment, a transient period can be reconfigured with maximum TA difference according to each carrier (or carrier group) in a manner of being different from a transient period defined by a legacy release-8/9/10.

For clarity, although following description is explained by a PCell (or PCell TAG) and an SCell (or SCell TAG), since there actually exist two or more the SCells (or SCell TAGs), the present invention can be identically applied to a combination of an SCell 1 (or SCell TAG 1) and an SCell 2 (or SCell TAG 2) and the like.

When multiple TAs are applied in inter-band CA environment, cases can be classified into following cases in consideration of all channels transmitted from the PCell and the SCell. The cases can be classified into a case (case 1) that PUSCH/PUCCH/SRS are transmitted from a cell (e.g., PCell) belonging to a TAG 1 and PRACH is transmitted from a cell (e.g., SCell) belonging to a TAG 2, a case (case 2) that PRACH is transmitted from both the cell (e.g., PCell) belonging to the TAG 1 and the cell (e.g., SCell) belonging to the TAG 2 and a case (case 3) that PUSCH/PUCCH/SRS are transmitted from both the cell (e.g., PCell) belonging to the TAG 1 and the cell (e.g., SCell) belonging to the TAG 2.

Whether a power control requirement is satisfied on the basis of a transient period defined by legacy release-8/9/10 is explained with reference to FIGS. 25 to 30 according to the aforementioned each of the cases.

FIGS. 25 to 30 are diagrams for examples of a transmission frame structure of a user equipment supporting carrier aggregation in multi-TA environment.

Figure 25:
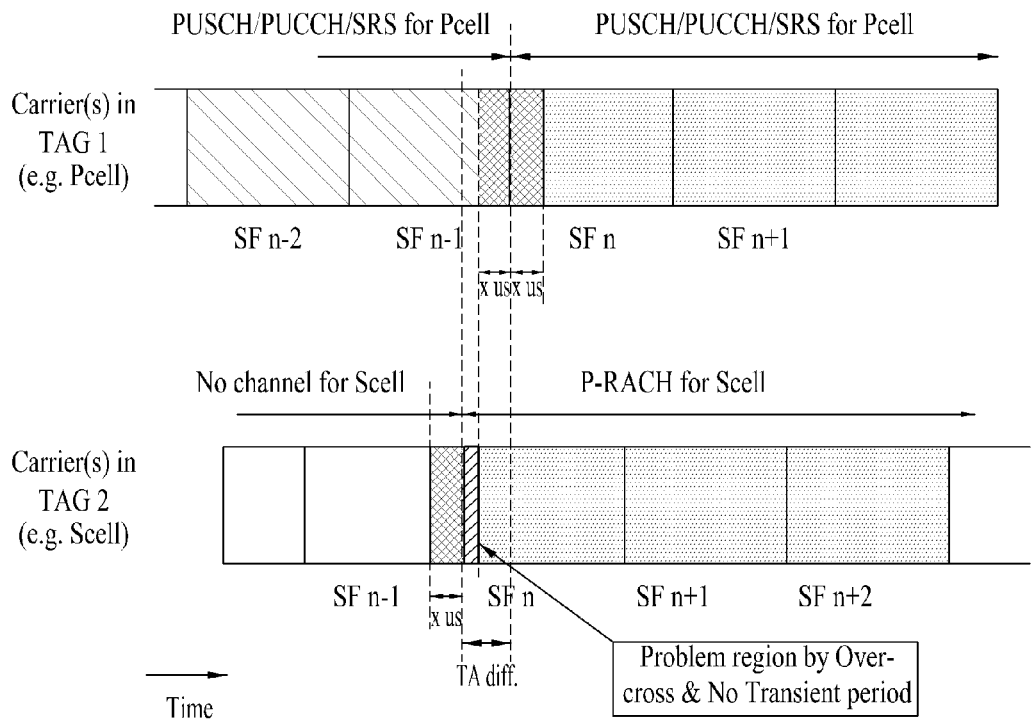
Figure 26:
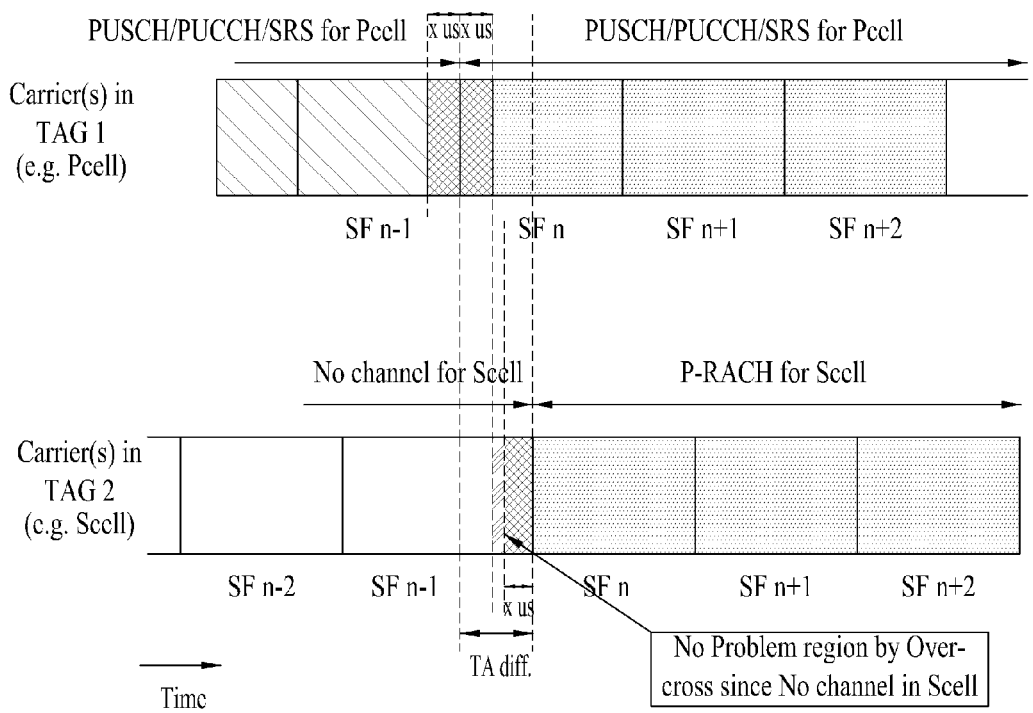
Figure 27:
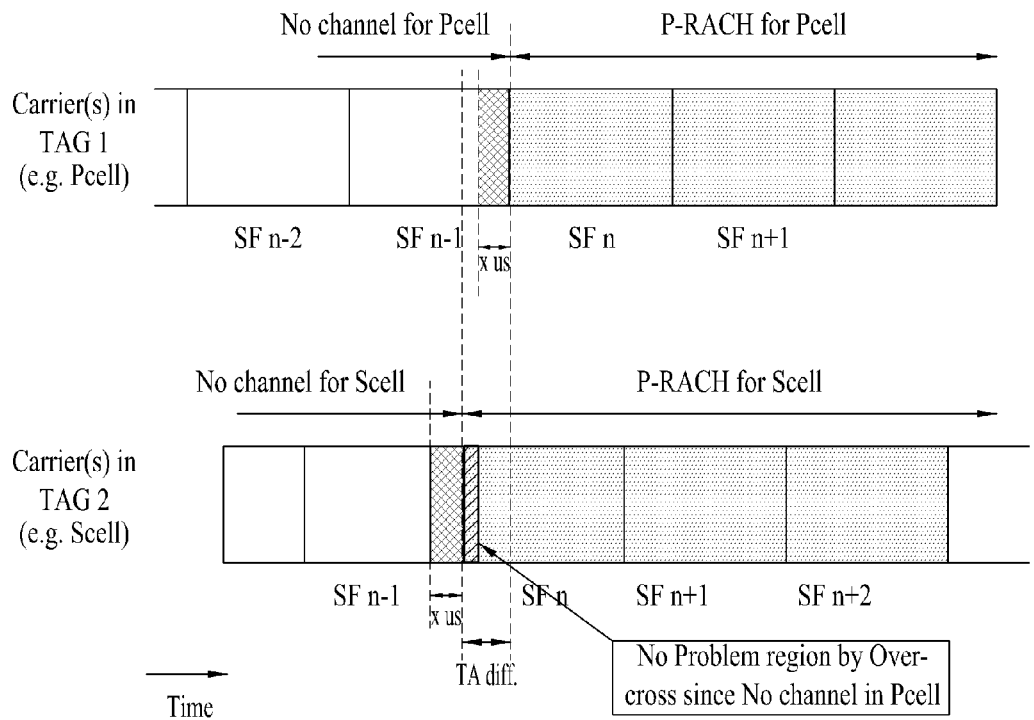
Figure 28:
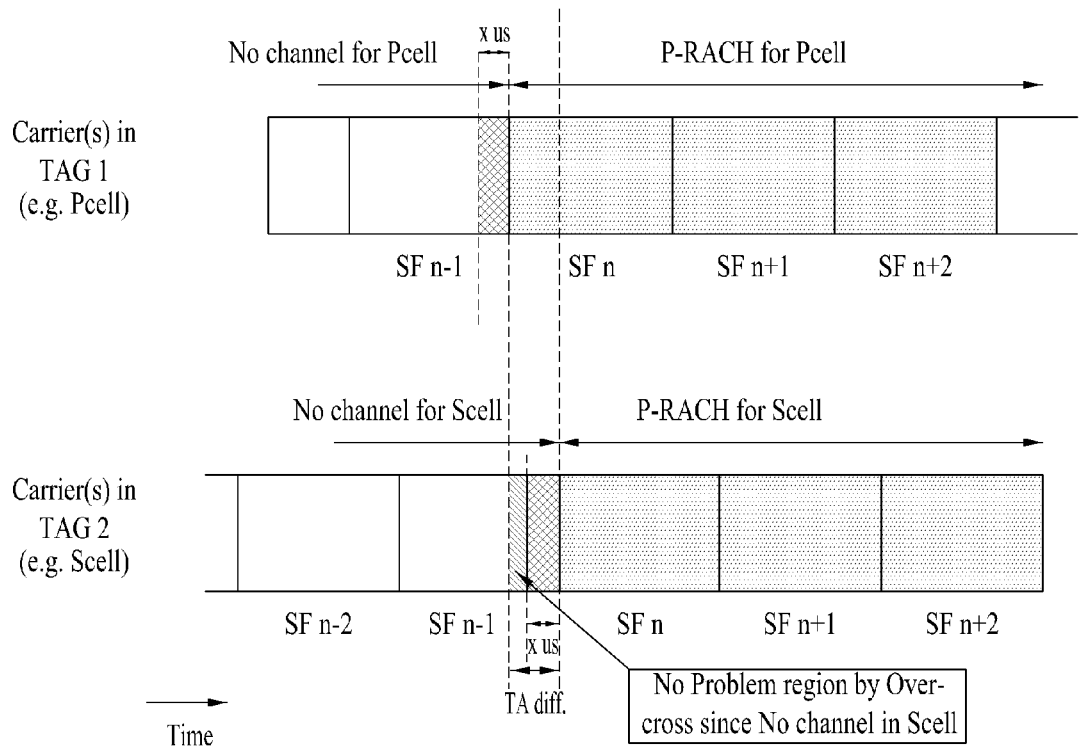
Figure 29:
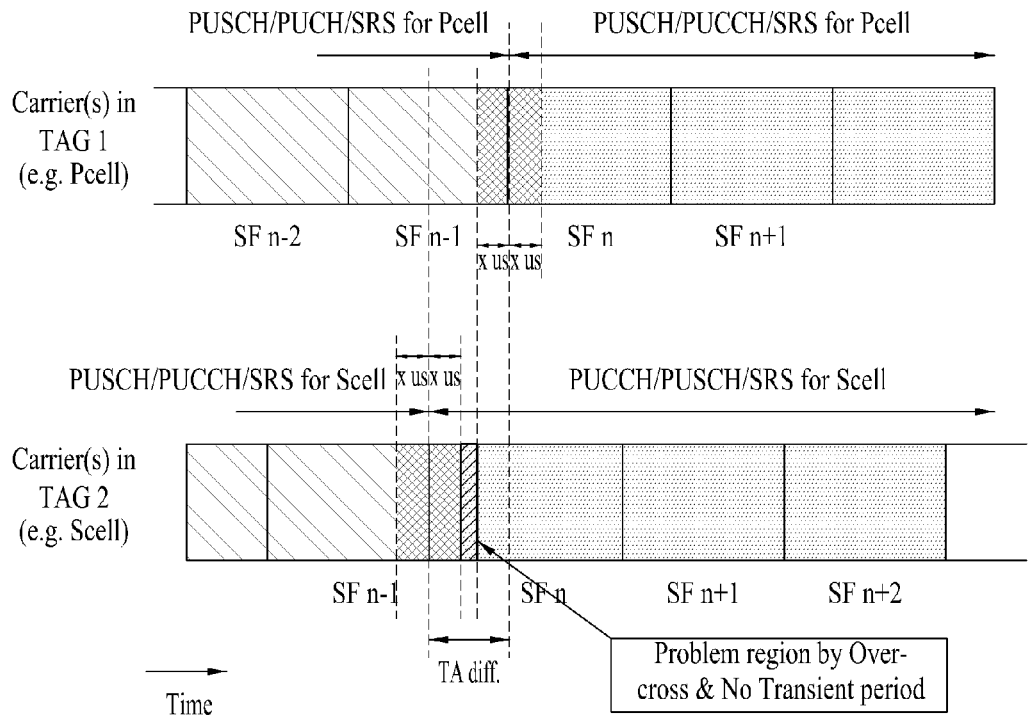
Figure 30:
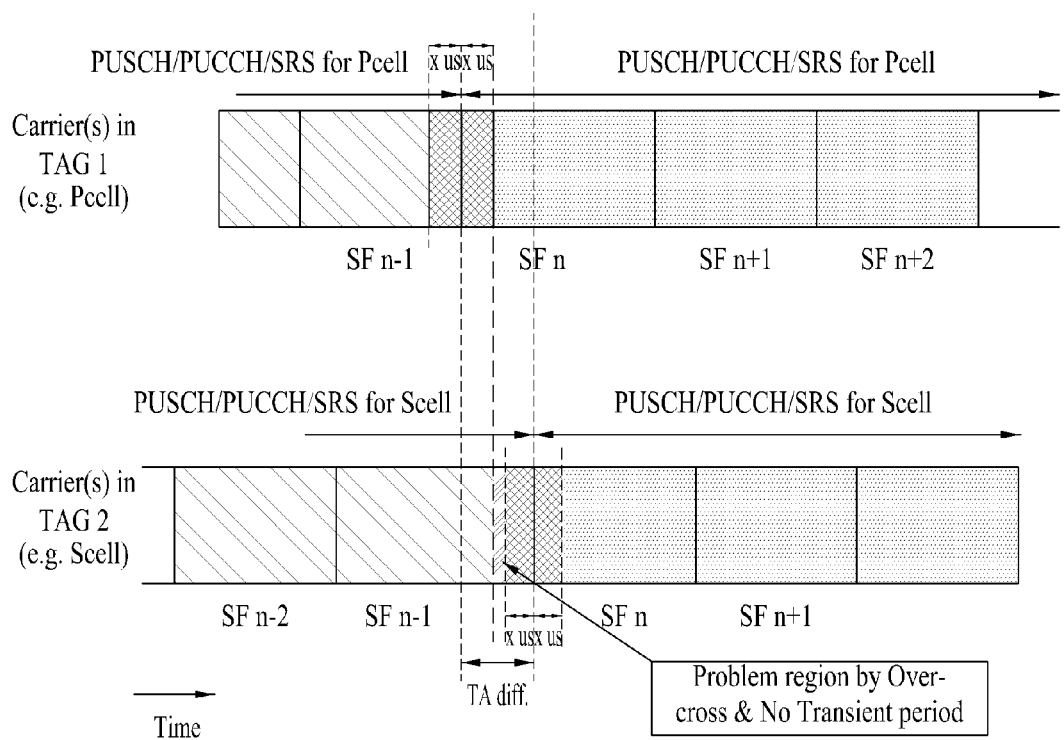

FIGS. 25 and 26 are diagrams for examples of the aforementioned case 1, FIGS. 27 and 28 are diagrams for examples of the aforementioned case 2 and FIGS. 29 and 30 are diagrams for examples of the aforementioned case 3

FIG. 25, FIG. 27 and FIG. 29 assume that a user equipment is positioned in the vicinity of a point performing communication via a cell (e.g., PCell) belonging to a TAG 1 rather than a point (e.g., eNode B or RRH) performing communication via a cell (e.g., SCell) belonging to a TAG 2. On the contrary, FIG. 26, FIG. 28 and FIG. 30 assume that the user equipment is positioned in the vicinity of the point performing communication via the cell (e.g., SCell) belonging to the TAG 2 rather than the point performing communication via the cell (e.g., PCell) belonging to the TAG 1.

Referring to FIGS. 25 and 26, the user equipment transmits contiguous PUSCH/PUCCH/SRS until a subframe (SF) n−1 in the cell (e.g., PCell) belonging to the TAG 1 and transmits contiguous PUSCH/PUCCH/SRS from a subframe n. FIGS. 25 and 26 show examples that a transient period is configured due to occurrence of power difference compared to a previous PUSCH/PUCCH/SRS. And, FIGS. 25 and 26 show a case that a transient period is configured in a manner that the user equipment does not perform transmission until the subframe n−1 in the cell (e.g., SCell) belonging to the TAG 2 and transmits PRACH from the subframe n.

In a situation such as the example shown in FIG. 25, if TA difference between the PCell and the SCell is greater than 20 μs, a problem that the subframe n−1 of the PCell and the subframe n of the SCell are overlapped with each other occurs. Hence, a phenomenon that the sum of UE signal transmitted to two cells violates a current specification occurs. On the contrary, in a situation such as the example shown in FIG. 26, although the TA difference between the PCell and the SCell is greater than 20 μs, a problem does not occur since there is no UL transmission in the subframe n−1 of the SCell.

FIGS. 27 and 28 show examples that a transient period is configured in a manner that a user equipment does not perform transmission until the subframe n−1 and transmits PRACH from the subframe n in the cell (e.g., PCell) belonging to the TAG 1. Similarly, FIGS. 27 and 28 show examples that a transient period is configured in a manner that the user equipment does not perform transmission until the subframe n−1 and transmits PRACH from the subframe n in the cell (e.g., SCell) belonging to the TAG 2.

In a situation such as the example shown in FIG. 27, although TA difference between the PCell and the SCell is greater than 20 µs, a problem of violating a current specification does not occur since there is no UL transmission in the subframe n−1 of the PCell. And, in a situation such as the example shown in FIG. 28, a problem does not occur since there is no UL transmission in the subframe n−1 of the SCell.

Referring to FIGS. 29 and 30, a user equipment transmits contiguous PUSCH/PUCCH/SRS until a subframe (SF) n−1 in a cell (e.g., PCell) belonging to a TAG 1 and transmits contiguous PUSCH/PUCCH/SRS from a subframe n. FIGS. 29 and 30 show examples that a transient period is configured due to occurrence of power difference compared to a previous PUSCH/PUCCH/SRS. Similarly, referring to FIGS. 29 and 30, the user equipment transmits contiguous PUSCH/PUCCH/SRS until a subframe n−1 in a cell (e.g., SCell) belonging to a TAG 2 and transmits contiguous PUSCH/PUCCH/SRS from a subframe n. FIGS. 29 and 30 show examples that a transient period is configured due to occurrence of power difference compared to a previous PUSCH/PUCCH/SRS.

In a situation such as the example shown in FIG. 29, if TA difference between the PCell and the SCell is greater than 40 µs, a problem that the subframe n−1 of the PCell and the subframe n of the SCell are overlapped with each other occurs. Similarly, in a situation such as the example shown in FIG. 30, if TA difference between the PCell and the SCell is greater than 40 µs, a problem that the subframe n−1 of the SCell and the subframe n of the PCell are overlapped with each other occurs.

As mentioned in the foregoing description, if the user equipment is positioned in the vicinity of the PCell, the first case (FIG. 25) and third case (FIG. 29), if the user equipment is positioned in the vicinity of the SCell, the third case (FIG. 30), do not satisfy ON/OFF time mask defined by current LTE-A CA environment. And, maximum output power of a UE transmitting end is not satisfied in a problem section (i.e., an overlapped region) and absolute/relative power tolerance is not satisfied in the problem section. The absolute/relative power tolerance is applied to single PUCCH/PUSCH/SRS transmission in adjacent (or contiguous) physical resource blocks. Absolute power tolerance indicates capability of a user equipment capable of configuring an initial output power with a specific value for an initial subframe in which contiguous or non-contiguous transmission having a transmission gap greater than 20 ms begins. In case of transmitting PRACH, the absolute power tolerance is specified in a very first preamble. And, if a transmission gap between subframes is less than 20 ms, the relative power tolerance indicates capability of the user equipment capable of relatively configuring output power of a target subframe in relation to power of a most recently transmitted reference subframe. In case of carrier aggregation, requirements of the aforementioned absolute/relative power tolerance can be applied according to each component carrier (or cell).

As mentioned in the foregoing description, when multi-TA is applied in the inter-band CA environment, there may or may not exist an over-crossed region between cells according to which channel is transmitted in each cell, how a TA value varies according to each cell (i.e., a cell at which a user equipment is adjacently positioned) and the like. In order to satisfy the absolute/relative power tolerance in the over-crossed region in all cases, a transient period can be reconfigured as follows. Regarding this, it shall be described with reference to FIG. 31 in the following.

Figure 31:
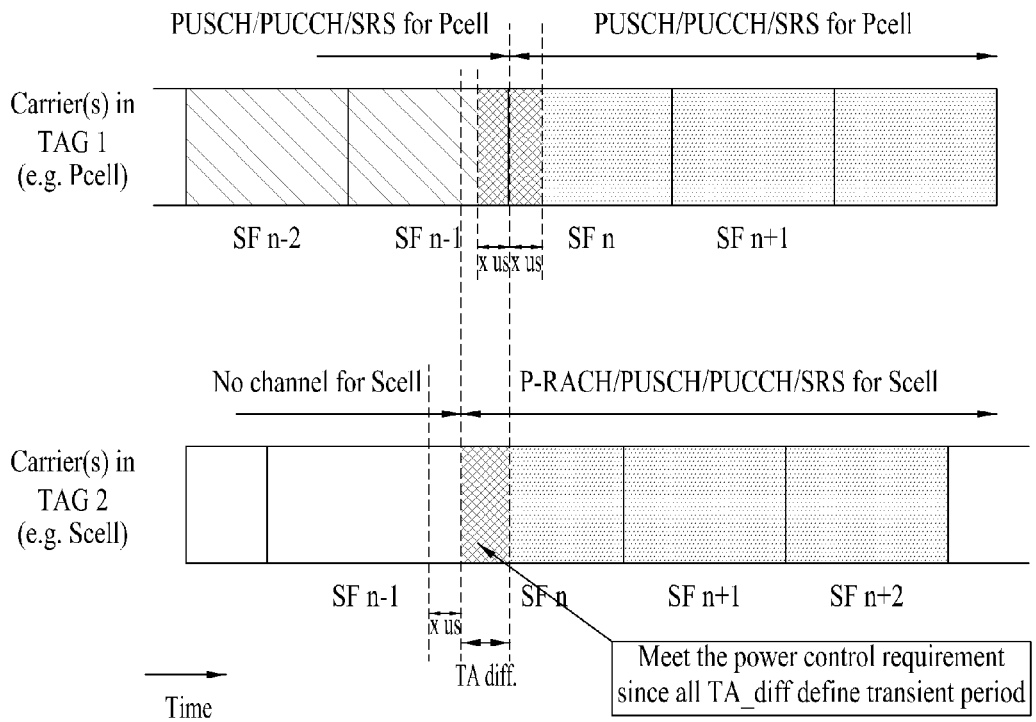
FIGS. 31 to 34 are diagrams for explaining a method of reconfiguring a transient period in multi-TA environment according to one embodiment of the present invention.

FIG. 31 is a diagram for explaining a method of reconfiguring a transient period in multi-TA environment according to one embodiment of the present invention.

Referring to FIG. 31, FIG. 31 shows an example of a method of reconfiguring a transient period in the aforementioned case of FIG. 25. In this case, in order to satisfy absolute/relative power tolerance in an over-crossed region, a region in which a previous subframe of a PCell and a current subframe of a SCell are overlapped with each other can be configured as transient time. In particular, in the cell (e.g., SCell) belonging to the TAG 2 in FIG. 25, transient time as much as (x µs+TA difference) can be applied in a manner of adding TA difference to x µs configured between the subframe n−1 and the subframe n.

Yet, if the transient time as much as (x µs+TA difference) is applied, the transient period can be configured as a transient period which is relatively too long. Hence, it is preferable to configure the transient period according to a case in a manner of comparing the TA difference with a size of the x µs.

First of all, if the TA difference is shorter than the x µs, minimum x µs including the TA difference can be applied as the transient period. In particular, if the TA difference is shorter than the x µs, since an over-crossed region of subframes different from each other does not occur between a plurality of cells, a previously defined x µs can be applied as the transient period. On the contrary, if the TA difference is longer than the x µs, as shown in FIG. 31, maximum TA difference can be configured as the transient time. In particular, as mentioned in the foregoing description, the transient time as much as maximum TA difference only can be applied without adding the TA difference to the x µs. Although FIG. 31 explains the method of reconfiguring the transient period in a manner of assuming the case of FIG. 25, the method can be identically applied to the cases of FIGS. 29 and 30 in which an over-crossed region occurs between cells.

Hence, according to the embodiment 1 proposed by the present invention, as a result of analyzing various channel configurations, if the TA difference is longer than the x µs, maximum TA difference is configured as the transient period. If the TA difference is shorter than the x µs, minimum x µs can be configured as the transient period to solve a problem that occurs. In particular, as shown in FIG. 31, absolute/relative tolerance requirement can be satisfied by determining the transient period according to whether the TA difference is longer than the x µs as shown in release-8/9/10.

Meanwhile, if an over-crossed region occurs, a transient period can be reconfigured by the aforementioned scheme in both cells (cell groups) in which the over-crossed region occurs. Or, the transient period can be reconfigured by the aforementioned scheme in a cell (cell group) only among the two cells (cell groups) in which the over-crossed region occurs. And, if a cell among the two cells (cell groups) in which the over-crossed region occurs corresponds to a PCell (or if a cell group includes the PCell), the transient period can be configured by the aforementioned scheme for a remaining cell (cell group) only. For instance, if the over-crossed region occurs between the Pcell and a SCell, or if the over-crossed region occurs between a PCell TAG and a SCell TAG, the transient period can be reconfigured for the PCell and the SCell TAG, respectively.

Embodiment 2

Unlike the aforementioned embodiment 1, embodiment 2 corresponds to a scheme capable of applying (additional or extended) transient time to a SCell while a PCell is protected as much as possible without considering channels transmitted from each cell.

Figure 32:
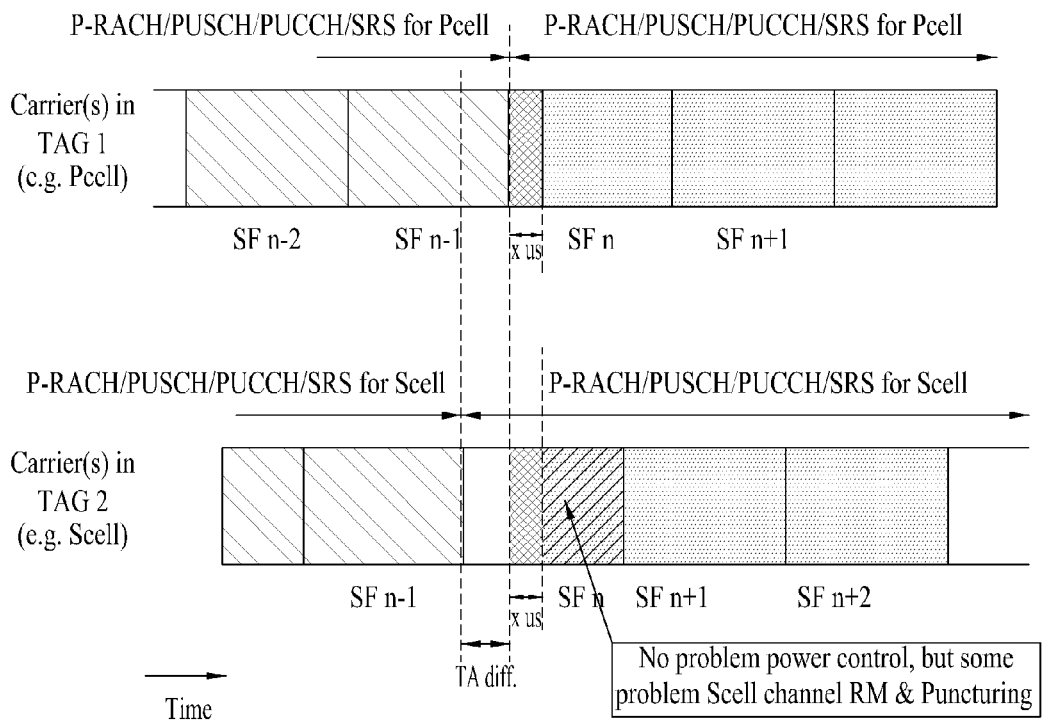
Figure 33:
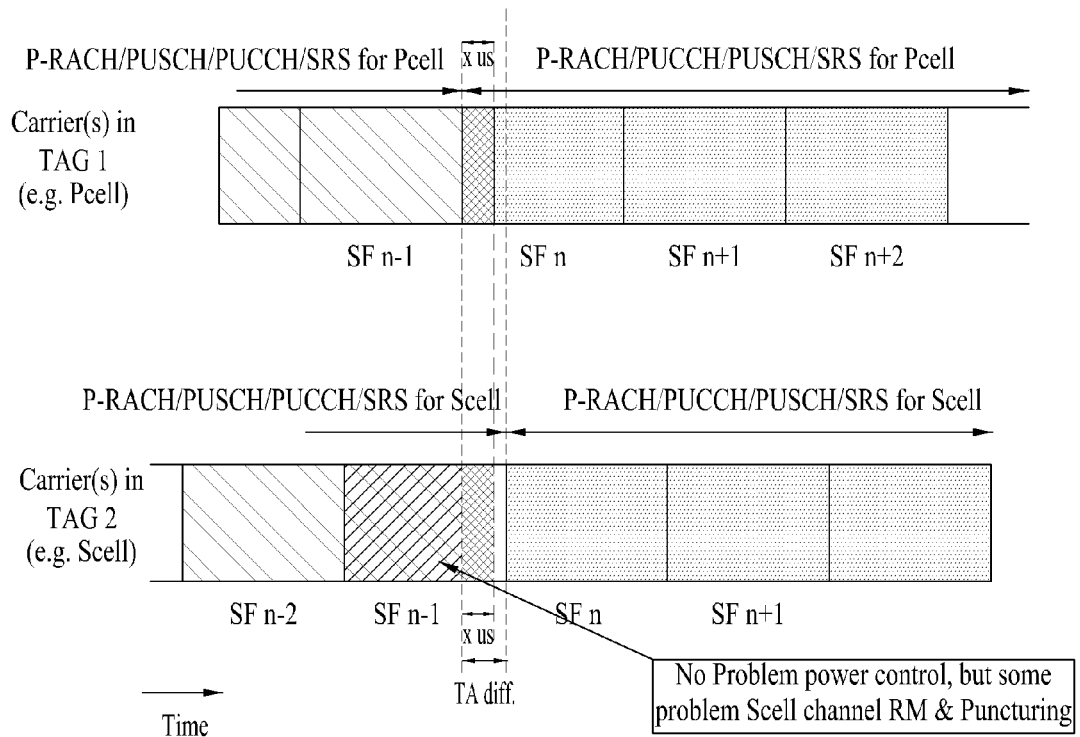

FIGS. 32 and 33 are diagrams for explaining a method of reconfiguring a transient period in multi-TA environment according to one embodiment of the present invention.

FIG. 32 assumes that a user equipment is positioned in the vicinity of a point performing communication via a cell (e.g., PCell) belonging to a TAG 1 rather than a point (e.g., eNode B or RRH) performing communication via a cell (e.g., SCell) belonging to a TAG 2. On the contrary, FIG. 33 assumes that the user equipment is positioned in the vicinity of the point performing communication via the cell (e.g., SCell) belonging to the TAG 2 rather than the point performing communication via the cell (e.g., PCell) belonging to the TAG 1.

Referring to FIG. 32 and FIG. 33, the user equipment transmits contiguous PUSCH/PUCCH/SRS until a subframe (SF) n−1 in the cell (e.g., PCell) belonging to the TAG 1 and transmits contiguous PUSCH/PUCCH/SRS from a subframe n. FIGS. 32 and 33 show examples that a transient period is configured due to occurrence of power difference compared to a previous PUSCH/PUCCH/SRS. Similarly, the user equipment transmits contiguous PUSCH/PUCCH/SRS until a subframe (SF) n−1 in the cell (e.g., SCell) belonging to the TAG 2 and transmits contiguous PUSCH/PUCCH/SRS from a subframe n. FIGS. 32 and 33 show examples that a transient period is configured due to occurrence of power difference compared to a previous PUSCH/PUCCH/SRS.

In a situation such as the example shown in FIG. 32, a user equipment configures a transient period after all data of a PCell are transmitted to protect the PCell. In particular, the user equipment configures the transient period in a subframe n after all transmissions of the PCell in a subframe n−1 are completed. In this case, the transient period x µs can be configured as '20 µs≤x≤40 µs' in a manner of preferentially protecting data transmitted from the PCell and starting in a next subframe. Similarly, a transient period of a SCell is configured on time identical to the transient period of the PCell. In this case, since there exists an over-crossed region between the subframe n−1 of the PCell and the subframe n of the SCell, rate matching (RM) and puncturing for a channel of the SCell should be additionally performed to transmit preferred data. By doing so, an eNode can receive the data. Hence, the user equipment punctures the data transmitted from the over-crossed region and may be then able to perform the rate matching to transmit UL data (including the punctured data), which is intended to be transmitted from the subframe n of the SCell, via a region except the (over-crossed region+transient period).

In a situation such as the example shown in FIG. 33, a user equipment configures a transient period after all data of a PCell are transmitted to protect the PCell. In particular, the user equipment configures the transient period in a subframe n after all transmissions of the PCell in a subframe n−1 are completed and a transient period of a SCell is configured on time identical to the transient period of the PCell. In this case, since the user equipment is positioned in the vicinity of the SCell, there exists an over-crossed region between a subframe n−1 of the SCell and a subframe n of the PCell, the user equipment punctures data transmitted from the over-crossed region and may be then able to perform the rate matching to transmit UL data (including the punctured data), which is intended to be transmitted from the subframe n−1 of the SCell, via a region except the (over-crossed region+transient period).

Hence, according to the embodiment 2 proposed by the present invention, as shown in FIGS. 32 and 33, in order to protect the PCell as much as possible, x µs transient period is applied after transmission of all data of the PCell are completed irrespective of which data is transmitted from the PCell. Regarding the SCell, data is efficiently distributed using the puncturing and the rate matching and a transient period is configured on time identical to the transient period of the PCell. By doing so, there may not exist a problem of power control. Consequently, the transient period is identically applied on the basis of the PCell and may be then able to satisfy absolute/relative power tolerance requirement such as release-8/9/10.

Embodiment 3

Aside from a general case and a special case of a legacy transient period, priority can be applied according to a channel transmitted from each cell. This scheme is about applying a transient period after a channel to be preferentially protected is passed by. The scheme can be implemented in a manner of applying relative priority according to each channel in accordance with various options.

In this case, a transient period is applied after a PUCCH, which is a top priority channel carrying control data (ACK/NACK, CQI, scheduling request and the like) of a user equipment, is transmitted irrespective of a cell transmitting the PUCCH. After that, a transient period is configured in a manner of putting priority on PUSCH or PRACH. And, as a lowest priority target, an SRS may apply a transient period in the SRS after transmission of all different channels is completed. Or, similar to this, in case of extending/adding a transient period, the transient period can be extended/added to PUSCH or PRACH rather than PUCCH, which is preferentially protected. Priority according to each channel is shown in the following.

Option 1) PUCCH>PUSCH>PRACH>SRS
Option 2) PUCCH>PRACH>PUSCH>SRS

Figure 34:
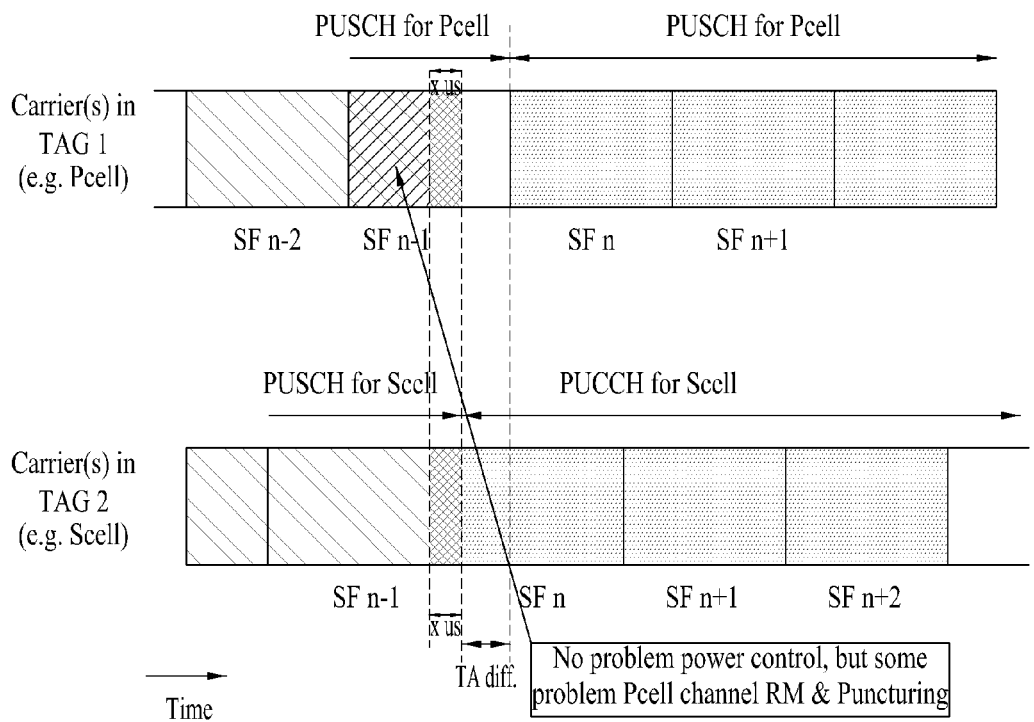

FIG. 34 is a diagram for explaining a method of reconfiguring a transient period in multi-TA environment according to one embodiment of the present invention.

FIG. 34 assumes that a user equipment is positioned in the vicinity of a point performing communication via a cell (e.g., PCell) belonging to a TAG 1 rather than a point (e.g., eNode B or RRH) performing communication via a cell (e.g., SCell) belonging to a TAG 2.

Referring to FIG. 34, the user equipment transmits contiguous PUSCH until a subframe (SF) n−1 in the cell (e.g., PCell) belonging to the TAG 1 and transmits contiguous PUSCH from a subframe n. FIG. 34 shows an example that a transient period is configured due to occurrence of power difference compared to a previous PUSCH. And, the user equipment transmits PUSCH until a subframe (SF) n−1 in the cell (e.g., SCell) belonging to the TAG 2 and transmits different PUSCH from a subframe n. FIG. 34 shows an example that a transient period is configured due to occurrence of power difference compared to a previous PUSCH.

As shown in FIG. 34, in case that the user equipment transmits PUCCH of top priority in the SCell, the user equipment applies a transient period to a PUSCH, which is situating immediately before PUCCH, to protect the PUCCH. In this case, a transient period x µs can be positioned at a subframe n−1 of the SCell to protect the PUCCH and the x µs can be configured as '20 µs≤x≤40 µs'. As mentioned in the foregoing description, the transient period is configured in the Scell and the user equipment can configure a transient period of PUSCH in the PCell on time identical to the transient period of the Scell. In this case, as mentioned earlier in the embodiment 2, a transient period is configured on the basis of PUCCH. Hence, it is necessary to perform rate matching and a puncturing scheme to properly transmit a front part or a channel of a different cell. In particular, since there exists an over-crossed region between a subframe n−1 of the PCell and a subframe n of the SCell, rate matching (RM) and puncturing for a channel of the PCell should be additionally performed to transmit preferred data. By doing so, an eNode can receive the data. Hence, the user equipment punctures the data transmitted from the over-crossed region and may be then able to perform the rate matching to transmit UL data (including the punctured data), which is intended to be transmitted from the subframe n−1 of the PCell, via a region except the (over-crossed region+transient period).

Hence, according to the embodiment 3 proposed by the present invention, as shown in FIG. 34, in order to protect PUCCH as much as possible, a transient period is applied after PUCCH transmission is completed or before the PUCCH transmission is started irrespective of a cell in which the PUCCH is transmitted. Regarding channels except the PUCCH, data is efficiently distributed using the puncturing and the rate matching and a transient period is configured on time identical to the PUCCH. By doing so, there may not exist a problem of power control. Consequently, the transient period is identically applied on the basis of the PUCCH and may be then able to satisfy absolute/relative power tolerance requirement such as release-8/9/10.

The Generals of Device to which the Present Invention is Applicable

Figure 35:
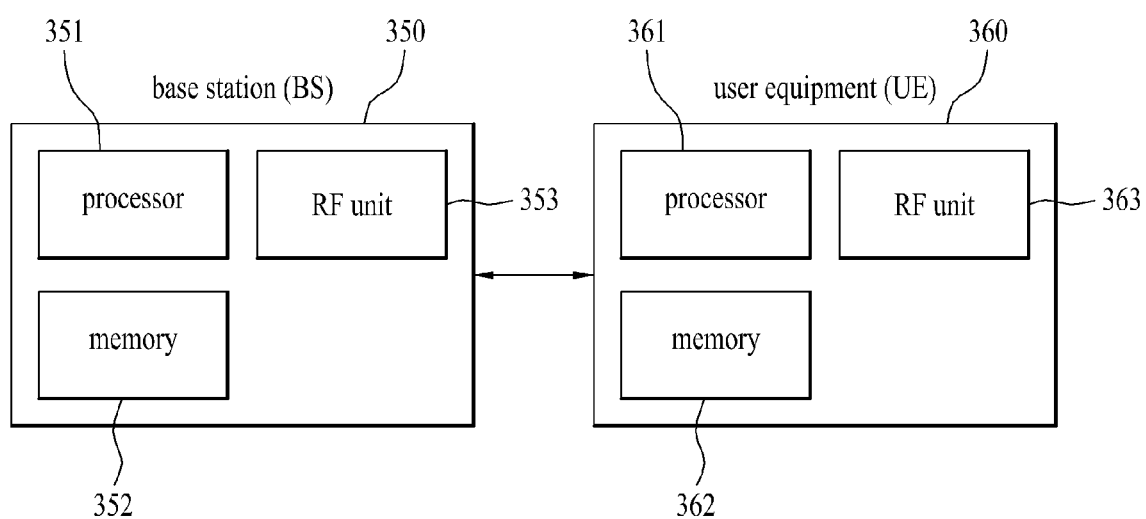
FIG. 35 is a block diagram for a radio communication device according to one embodiment of the present invention.

FIG. 35 is a block diagram for a radio communication device according to one embodiment of the present invention.

Referring to FIG. 35, a wireless communication system includes a base station 350 and a plurality of user equipments 360 positioned within a region of the base station 350.

The base station 350 includes a processor 351, a memory 352 and a radio frequency (RF) unit 353. The processor 351 implements a proposed function, a procedure and/or a method. Layers of a wireless interface protocol can be implemented by the processor 351. The memory 352 is connected with the processor 351 and store various information necessary for driving the processor 351. The RF unit 353 is connected with the processor 351 and transmits and/or receives a radio signal.

A user equipment 360 includes a processor 361, a memory 362 and a radio frequency (RF) unit 363. The processor 361 implements a proposed function, a procedure and/or a method. Layers of a wireless interface protocol can be implemented by the processor 361. The memory 362 is connected with the processor 361 and store various information necessary for driving the processor 361. The RF unit 363 is connected with the processor 361 and transmits and/or receives a radio signal. In particular, in the present invention, the RF unit 363 means an RF chain (or RF receiver) in the aforementioned embodiments. And, the RF unit 363 can be configured by one or more RF units. In case of configuring the RF unit by a plurality of RF units, each of a plurality of RF units can independently support transmission and/or reception of a radio signal via each cell (primary cell or secondary cell).

The memory 352/362 may be installed inside or outside of the processor 351/361 and can be connected with the processor 351/361 with well-known means. And, the base station 350 and/or the user equipment 360 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting and receiving data in a wireless access system according to the present invention is explained centering on an example applied to 3GPP LTE system, the present invention can be identically applied to various wireless access systems as well as 3GPP LTE system.

What is claimed is:

1. A method of controlling an uplink transmit power of a user equipment in a wireless access system supporting carrier aggregation, the method comprising:
   receiving, by the user equipment, a first TA (timing advance) value and a second TA value for a first TAG (timing advance group) containing one or more component carriers and a second TAG containing one or more component carriers, respectively;
   adjusting, by the user equipment, an uplink transmission timing of the first TAG and an uplink transmission timing of the second TAG using the first TA value and the second TA value; and
   if a maximum transmit power of the user equipment exceeds a power control requirement in a region in which subframes different from each other are overlapped except a transient period of the first TAG and the second TAG, reconfiguring, by the user equipment, the transient period,
   wherein the controlling the uplink transmit power is performed according to the transient period reconfigured by the user equipment.

2. The method of claim 1, wherein the transient period is reconfigured by a greater value among a difference between the first TA value and the second TA value and the transient period to contain the overlapped region.

3. The method of claim 2, wherein one of a transient period of the first TAG and a transient period of the second TAG is reconfigured only by the greater value among the difference between the first TA value and the second TA value and the transient period.

4. The method of claim 2, wherein if the first TAG contains a primary component carrier, a transient period of the second TAG is reconfigured only by the greater value among the difference between the first TA value and the second TA value and the transient period.

5. The method of claim 1, wherein if the first TAG contains a primary component carrier, a transient period of the second TAG is reconfigured to be matched with a transient period of the first TAG to preferentially protect the primary component carrier, wherein data transmitted from the overlapped region of the second TAG is punctured and wherein the punctured data is transmitted in a manner of being rate-matched in a region except the overlapped region of a subframe containing the overlapped region of the second TAG.

6. The method of claim 1, wherein a transient period of a TAG containing an uplink channel of low priority among the first TAG and the second TAG is reconfigured to be matched with a transient period of a TAG containing an uplink channel of high priority in consideration of priority of the uplink channel transmitted from the overlapped region, wherein data of the TAG of low priority transmitted from the overlapped region is punctured and wherein the punctured data is transmitted in a manner of being rate matched in a region except the overlapped region of a subframe containing the overlapped region of the TAG of low priority.

7. The method of claim 6, wherein the priority of the uplink channel is determined as PUCCH (physical uplink control channel), PUSCH (physical uplink shared channel) or PRACH (physical random access channel), and SRS (sounding reference signal) in descending order.

8. A user equipment controlling an uplink transmit power in a wireless access system supporting carrier aggregation, the user equipment comprising:
an RF (radio frequency) unit configured to transmit and receive a radio signal; and
a processor which is configured to:
receive a first TA (timing advance) value and a second TA value for a first TAG (timing advance group) containing one or more component carriers and a second TAG containing one or more component carriers, respectively;
adjust an uplink transmission timing of the first TAG and an uplink transmission timing of the second TAG using the first TA value and the second TA value; and
if a maximum transmit power of the user equipment exceeds a power control requirement in a region in which subframes different from each other are overlapped except a transient period of the first TAG and the second TAG, reconfigure the transient period,
wherein the controlling the uplink transmit power is performed according to the transient period reconfigured by the processor.

9. The user equipment of claim 8, wherein the transient period is reconfigured by a greater value among a difference between the first TA value and the second TA value and the transient period to contain the overlapped region.

10. The user equipment of claim 9, wherein one of a transient period of the first TAG and a transient period of the second TAG is reconfigured only by the greater value among the difference between the first TA value and the second TA value and the transient period.

11. The user equipment of claim 9, wherein if the first TAG contains a primary component carrier, a transient period of the second TAG is reconfigured only by the greater value among the difference between the first TA value and the second TA value and the transient period.

12. The user equipment of claim 8, wherein if the first TAG contains a primary component carrier, a transient period of the second TAG is reconfigured to be matched with a transient period of the first TAG to preferentially protect the primary component carrier, wherein data transmitted from the overlapped region of the second TAG is punctured and wherein the punctured data is transmitted in a manner of being rate-matched in a region except the overlapped region of a subframe containing the overlapped region of the second TAG.

13. The user equipment of claim 8, wherein a transient period of a TAG containing an uplink channel of low priority among the first TAG and the second TAG is reconfigured to be matched with a transient period of a TAG containing an uplink channel of high priority in consideration of priority of the uplink channel transmitted from the overlapped region, wherein data of the TAG of low priority transmitted from the overlapped region is punctured and wherein the punctured data is transmitted in a manner of being rate matched in a region except the overlapped region of a subframe containing the overlapped region of the TAG of low priority.

14. The user equipment of claim 13, wherein the priority of the uplink channel is determined as PUCCH (physical uplink control channel), PUSCH (physical uplink shared channel) or PRACH (physical random access channel), and SRS (sounding reference signal) in descending order.

* * * * *